US009048906B2

(12) United States Patent
Kliger

(10) Patent No.: US 9,048,906 B2
(45) Date of Patent: Jun. 2, 2015

(54) BEAMFORMING PRECODING MATRIX USING NON-UNIFORM ANGLES QUANTIZATION

(75) Inventor: Avi Kliger, Ramat Gan (IL)

(73) Assignee: Broadcom Corporation, Irvine, CA (US)

( * ) Notice: Subject to any disclaimer, the term of this patent is extended or adjusted under 35 U.S.C. 154(b) by 454 days.

(21) Appl. No.: 13/346,170

(22) Filed: Jan. 9, 2012

(65) Prior Publication Data

US 2012/0281742 A1 Nov. 8, 2012

Related U.S. Application Data

(60) Provisional application No. 61/482,098, filed on May 3, 2011.

(51) Int. Cl.
*H04B 1/38* (2006.01)
*H04B 7/06* (2006.01)

(52) U.S. Cl.
CPC ...... *H04B 7/0617* (2013.01); *H04B 2203/5445* (2013.01); *H04B 7/0658* (2013.01)

(58) Field of Classification Search
CPC ................. H03M 2201/2208; H03M 13/6577; H04L 27/2647
USPC .......................................................... 375/220
See application file for complete search history.

(56) References Cited

U.S. PATENT DOCUMENTS

| | | | | |
|---|---|---|---|---|
| RE40,691 | E * | 3/2009 | Lim | 704/206 |
| 8,023,577 | B2 * | 9/2011 | Pande et al. | 375/260 |
| 2007/0064780 | A1 * | 3/2007 | Zheng et al. | 375/220 |
| 2007/0271398 | A1 * | 11/2007 | Manchester et al. | 709/249 |
| 2011/0223867 | A1 * | 9/2011 | Chae et al. | 455/63.1 |

* cited by examiner

*Primary Examiner* — Lihong Yu
(74) *Attorney, Agent, or Firm* — Garlick & Markison; Shayne X. Short

(57) ABSTRACT

Beamforming precoding matrix using non-uniform angles quantization. Adaptively generated feedback information is provided between communication devices that communicate using more than one communication path, link, connection, etc. With respect to feeding back different types of information having different respective characteristics (e.g., different respective probability density functions), different and respective quantization may be employed for the different types of information. For example, uniform, Gaussian, or per bit loop optimized quantization may be individually selected and employed for each of the different types of feedback information used in a wired communication system (e.g., one which is implemented or compliant in accordance with PLC/HP (Powerline/HomePlug), and/or at least one version of the IEEE 1901-2010—IEEE Standard for Broadband over Power Line Networks: Medium Access Control and Physical Layer Specifications), signaling may be effectuated between communication devices using more than one communication pathway (e.g., more than one communication link between respective communication devices).

20 Claims, 18 Drawing Sheets

700

800

| Q levels | value | |
|---|---|---|
| 0 | | |
| | 0.1645 | 1 |
| 0.2445 | | |
| | 0.3244 | 2 |
| 0.4012 | | |
| | 0.478 | 3 |
| 0.5564 | | |
| | 0.6349 | 4 |
| 0.7131 | | |
| | 0.7913 | 5 |
| 0.8767 | | |
| | 0.9622 | 6 |
| 1.0641 | | |
| | 1.1661 | 7 |
| 1.2408 | | |
| | 1.3155 | 8 |
| 1.5707 | | |

1200

| loop | "optimal" (16 bit) | 8 bit uniform | 8 bit Gaussian optimized | 8 bit loop optimized | performance comparison | |
|---|---|---|---|---|---|---|
| P11P04 | 70.3 | 62.1 | 65.9 | 66.2 | 6.04% | 6.50% |
| P11P03 | 66.7 | 55.3 | 59.0 | 59.2 | 6.60% | 7.01% |
| P14P11 | 87.5 | 76.2 | 82.7 | 82.6 | 8.53% | 8.41% |
| P14P04 | 148.8 | 147.0 | 147.4 | 148.0 | 0.29% | 0.63% |
| P14P03 | 55.9 | 45.7 | 50.7 | 51.1 | 10.94% | 11.86% |
| P02P11 | 88.0 | 76.4 | 81.1 | 81.2 | 6.22% | 6.36% |
| P02P03 | 66.9 | 61.2 | 63.2 | 63.8 | 3.33% | 4.25% |
| P02P14 | 151.2 | 145.5 | 148.8 | 150.0 | 2.25% | 3.07% |
| P03P04 | 77.8 | 73.2 | 74.4 | 73.9 | 1.63% | 0.94% |
| P02P04 | 390.6 | 390.2 | 390.4 | 390.5 | 0.05% | 0.07% |
| P40P02 | 76.7 | 62.9 | 65.3 | 67.4 | 3.82% | 7.14% |
| P40P03 | 63.3 | 56.7 | 58.2 | 57.8 | 2.67% | 1.89% |
| P40P04 | 57.8 | 49.5 | 51.0 | 53.8 | 3.05% | 8.80% |

s in mega-bits

Table 1: PHY Rate loop performance: 8-bit, TX power to received noise ratio = 50 dB

FIG. 12

1600
P1403
PHY rate (Mbps)
40
38
36
34
32
30
43.5
44
44.5
45
45.5
46
46.5
47
47.5
48
TX power to received power (dB)
1.7 dB

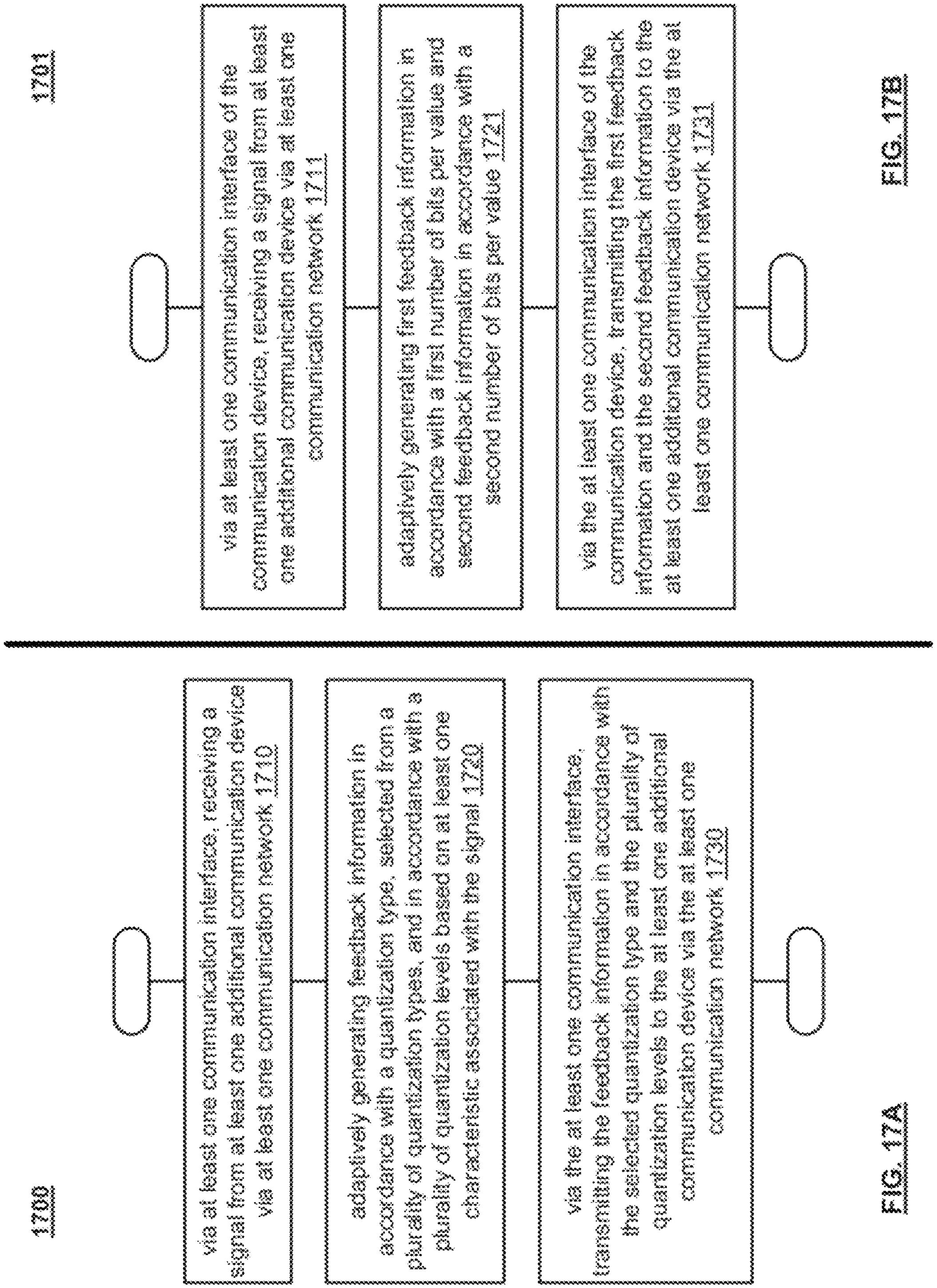
1700
via at least one communication interface, receiving a signal from at least one additional communication device via at least one communication network 1710
adaptively generating feedback information in accordance with a quantization type, selected from a plurality of quantization types, and in accordance with a plurality of quantization levels based on at least one characteristic associated with the signal 1720
via the at least one communication interface, transmitting the feedback information in accordance with the selected quantization type and the plurality of quantization levels to the at least one additional communication device via the at least one communication network 1730
FIG. 17A
1701
via at least one communication interface of the communication device, receiving a signal from at least one additional communication device via at least one communication network 1711
adaptively generating first feedback information in accordance with a first number of bits per value and second feedback information in accordance with a second number of bits per value 1721
via the at least one communication interface of the communication device, transmitting the first feedback information and the second feedback information to the at least one additional communication device via the at least one communication network 1731
FIG. 17B

BEAMFORMING PRECODING MATRIX USING NON-UNIFORM ANGLES QUANTIZATION

CROSS REFERENCE TO RELATED PATENTS/PATENT APPLICATIONS

Provisional Priority Claims

The present U.S. Utility patent application claims priority pursuant to 35 U.S.C. §119(e) to the following U.S. Provisional Patent Application which is hereby incorporated herein by reference in its entirety and made part of the present U.S. Utility patent application for all purposes:

1. U.S. Provisional Patent Application Ser. No. 61/482,098, entitled "Beamforming precoding matrix using non-uniform angles quantization,"filed May 3, 2011, pending.

Incorporation by Reference

The following U.S. Utility patent application is hereby incorporated herein by reference in its entirety and made part of the present U.S. Utility patent application for all purposes:

1. U.S. Utility patent application Ser. No. 11/168,793, entitled "Reduced feedback for beamforming in a wireless communication,"filed Jun. 28, 2005, now U.S. Pat. No. 7,738,583 B2, issued on Jun. 15, 2010, which claims priority pursuant to 35 U.S.C. §119(e) to the following U.S. Provisional Patent Application which is hereby incorporated herein by reference in its entirety and made part of the present U.S. Utility patent application for all purposes:
   a. U.S. Provisional Patent Application Ser. No. 60/673,451, entitled "Reduced feedback for beamforming in a wireless communication,"filed Apr. 21, 2005, now expired.

Incorporation by Reference

The following IEEE standards/IEEE draft standards, standards/draft standards, specifications, and/or recommended practices are hereby incorporated herein by reference in their entirety and are made part of the present U.S. Utility patent application for all purposes:

1. IEEE Std 802.1AB™-2009 (Revision of IEEE Std 802.1AB™-2005), IEEE Standard for Local and Metropolitan Area Networks—Station and Media Access Control Connectivity Discovery, IEEE Computer Society, Sponsored by the LAN/MAN Standards Committee, 17 Sep. 2009, 204 pages.

2. IEEE P802.1Q-REV/D1.5, March 2011, IEEE Approved Draft Standard for Local and Metropolitan Area Networks—Media Access Control (MAC) Bridges and Virtual Bridged Local Area Networks, 29 Aug. 2011, 1376 pages.

3. IEEE P1905.1™/D01.00, 13 Dec. 2011, 1905_1-11-0101-00-WGDC CDHN, IEEE P1905.1™/D01.00 Draft Standard for Convergent Digital Home Network for Heterogeneous Technologies, Sponsor: Standards Committee of the IEEE Communications Society, IEEE-SA Standards Board, Prepared by the P1905.1 Working Group of the IEEE Communications Society, 79 total pages.

4. IEEE 1901-2010—IEEE Standard for Broadband over Power Line Networks: Medium Access Control and Physical Layer Specifications, Working Group: BPLPHMAC—Broadband Over Power Lines PHY/MAC Working Group, Oversight Committee: COM/PLC—Power Line Communications, Sponsor: IEEE communications Society, Dec. 30, 2010, 1586 total pages.

5. HomePlug® Power Alliance—AV2 Specification.

6. International Telecommunication Union's (ITU) Next Generation Wired Home Networking Standard, ITU-T G.hn/HomeGrid ITU-T Home Networking Recommendation.

BACKGROUND OF THE INVENTION

1. Technical Field of the Invention

The invention relates generally to communication systems; and, more particularly, it relates to communication of feedback information between respective communication devices within such communication systems.

2. Description of Related Art

Data communication systems have been under continual development for many years. One particular type of communication system is particularly related to heterogeneous networking technologies which may be implemented in accordance with home networking technologies. For example, within certain such network environments, as few as one or two or more different types of different respective network technologies may be implemented in accordance with a common abstract layer for supporting communications among such different network technologies.

As an example, different types of networks that may be implemented within such a heterogeneous networking technology environment may be varied. In addition, while it is noted that as few as one type or more than one different type of networks may be implemented within such a homogeneous or heterogeneous networking technology environment, the present art does not provide a means by which such networks may operate effectively and seamlessly with respect to another.

For example, within any one respective communication network, there may be multiple respective communication links therein. Furthermore, sometimes two or more respective communication devices may be implemented to effectuate communications there between using more than one respective communication past. For example, in certain situations, different respective communication devices may communicate with one another using more than one communication link. In addition, certain difficulties and challenges may arise with respect to such communications between communication devices based on characteristics associated with either the different respective communication links by which various communication devices are connected and/or the types of signals communicated between such communication devices. The present art does not provide an adequate means by which such problems and/or deficiencies may be adequately addressed and dealt with.

BRIEF DESCRIPTION OF THE SEVERAL VIEWS OF THE DRAWINGS

FIG. 12 illustrates an embodiment of a table for physical layer (PHY) rate loop performance using 8 bits where transmit power to received noise ratio is 50 dB.

FIG. 17A, FIG. 17B, and FIG. 18 illustrate various embodiments of methods for operating one or more communication devices.

DETAILED DESCRIPTION OF THE INVENTION

Figure 1:
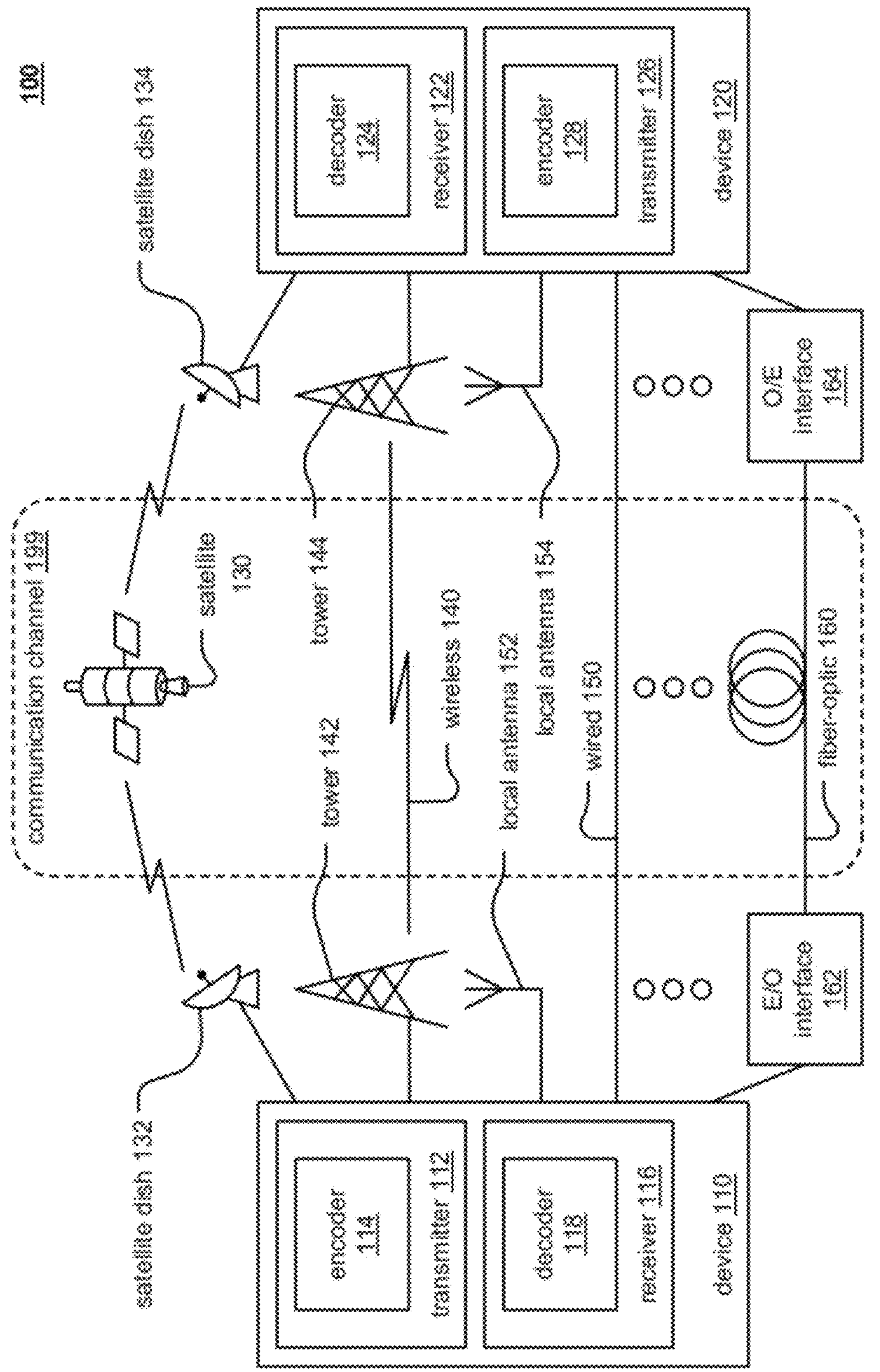
FIG. 1, FIG. 2, FIG. 3, and FIG. 4 illustrate various embodiments of communication systems.

Within communication systems, signals are transmitted between various communication devices therein. The goal of digital communications systems is to transmit digital data from one location, or subsystem, to another either error free or with an acceptably low error rate. As shown in FIG. 1, data may be transmitted over a variety of communications channels in a wide variety of communication systems: magnetic media, wired, wireless, fiber, copper, and other types of media as well.

FIG. 1, FIG. 2, FIG. 3, and FIG. 4 illustrate various embodiments of communication systems, 100, 200, 300, and 400, respectively.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

It is noted that such communication devices 110 and/or 120 may be stationary or mobile without departing from the scope and spirit of the invention. For example, either one or both of the communication devices 110 and 120 may be implemented in a fixed location or may be a mobile communication device with capability to associate with and/or communicate with more than one network access point (e.g., different respective access points (APs) in the context of a mobile communication system including one or more wireless local area networks (WLANs), different respective satellites in the context of a mobile communication system including one or more satellite, or generally, different respective network access points in the context of a mobile communication system including one or more network access points by which communications may be effectuated with communication devices 110 and/or 120.

In addition, any such types of wired communication systems may be varied and include, though not be limited to, cable communication systems (e.g., including those providing one or both of cable television services and Internet services), telephone communication systems, etc. Some particular examples of certain types of wired communication systems include those operative and compliant in accordance with any or more version of any one or more of IEEE 1901-2010—IEEE Standard for Broadband over Power Line Networks: Medium Access Control and Physical Layer Specifications, HomePlug® Power Alliance—AV2 Specification, and International Telecommunication Union's (ITU) G.hn/HomeGrid ITU-T Home Networking Recommendation, etc.

To reduce transmission errors that may undesirably be incurred within a communication system, error correction and channel coding schemes are often employed. Generally, these error correction and channel coding schemes involve the use of an encoder at the transmitter end of the communication channel 199 and a decoder at the receiver end of the communication channel 199.

Any of various types of ECC codes described can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

Generally speaking, when considering a communication system in which data is communicated from one location, or subsystem, to another, data encoding may generally be viewed as being performed at a transmitting end of the communication channel 199, and data decoding may generally be viewed as being performed at a receiving end of the communication channel 199.

Also, while the embodiment of this diagram shows bi-directional communication being capable between the communication devices 110 and 120, it is of course noted that, in some embodiments, the communication device 110 may include only encoding capability, and the communication device 120 may include only decoding capability, or vice versa (e.g., in a uni-directional communication embodiment such as in accordance with a broadcast embodiment such as a television and/or video broadcast embodiment).

Figure 2:
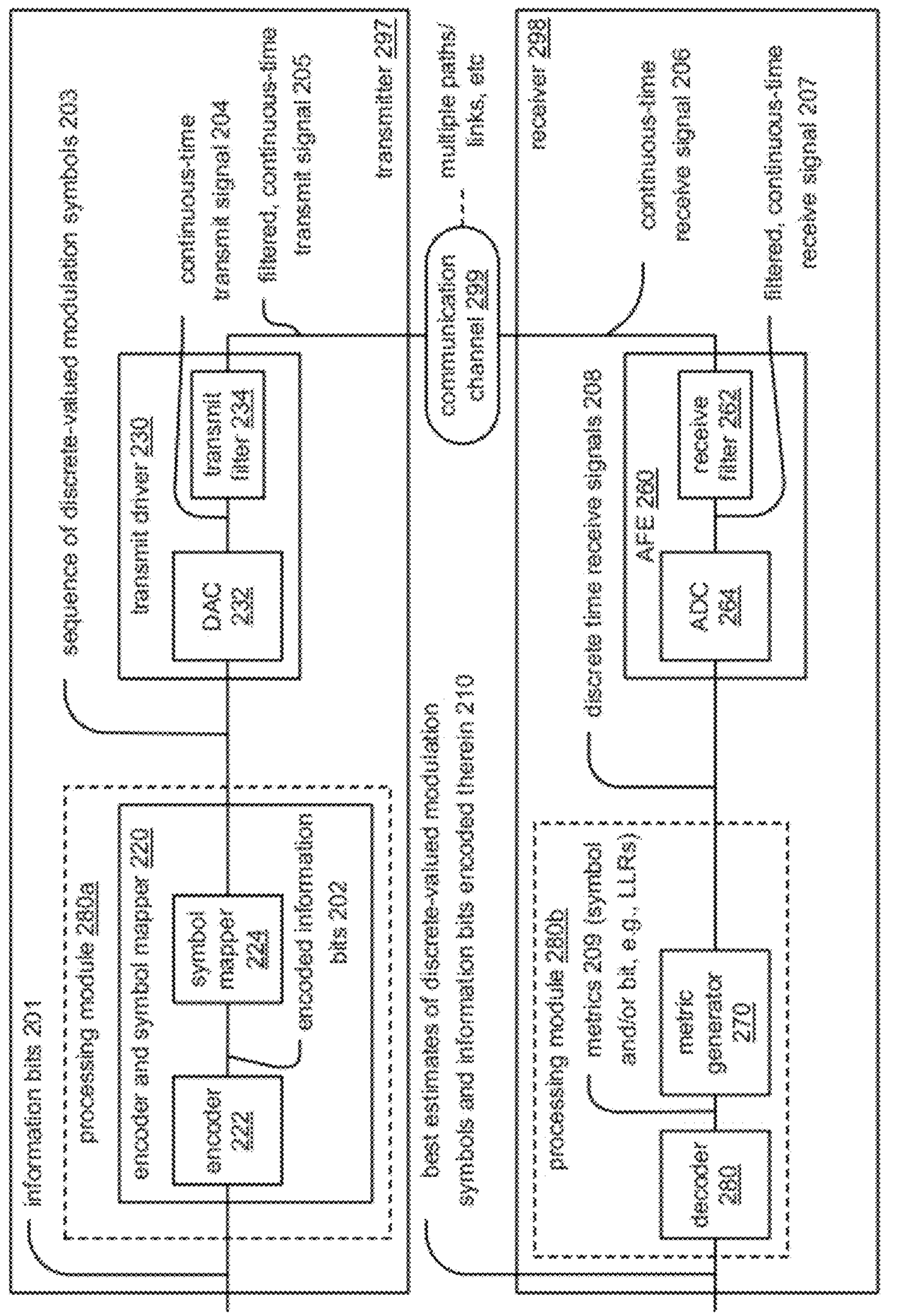

Referring to the communication system 200 of FIG. 2, at a transmitting end of a communication channel 299, information bits 201 are provided to a transmitter 297 that is operable to perform encoding of these information bits 201 using an encoder and symbol mapper 220 (which may be viewed as being distinct functional blocks 222 and 224, respectively) thereby generating a sequence of discrete-valued modulation symbols 203 that is provided to a transmit driver 230 that uses a DAC (Digital to Analog Converter) 232 to generate a continuous-time transmit signal 204 and a transmit filter 234 to generate a filtered, continuous-time transmit signal 205 that substantially comports with the communication channel 299. At a receiving end of the communication channel 299, continuous-time receive signal 206 is provided to an AFE (Analog Front End) 260 that includes a receive filter 262 (that generates a filtered, continuous-time receive signal 207) and an ADC (Analog to Digital Converter) 264 (that generates discrete-time receive signals 208). A metric generator 270 calculates metrics 209 (e.g., on either a symbol and/or bit basis) that are employed by a decoder 280 to make best estimates of the discrete-valued modulation symbols and information bits encoded therein 210.

Within each of the transmitter 297 and the receiver 298, any desired integration of various components, blocks, functional blocks, circuitries, etc. Therein may be implemented. For example, this diagram shows a processing module 280*a* as including the encoder and symbol mapper 220 and all associated, corresponding components therein, and a processing module 280 is shown as including the metric generator 270 and the decoder 280 and all associated, corresponding components therein. Such processing modules 280*a* and 280*b* may be respective integrated circuits. Of course, other boundaries and groupings may alternatively be performed without departing from the scope and spirit of the invention. For example, all components within the transmitter 297 may be included within a first processing module or integrated circuit, and all components within the receiver 298 may be included within a second processing module or integrated circuit. Alternatively, any other combination of components within each of the transmitter 297 and the receiver 298 may be made in other embodiments.

As with the previous embodiment, such a communication system 200 may be employed for the communication of data from one location, or subsystem, to another (e.g., from transmitter 297 to the receiver 298 via the communication channel 299).

Figure 3:
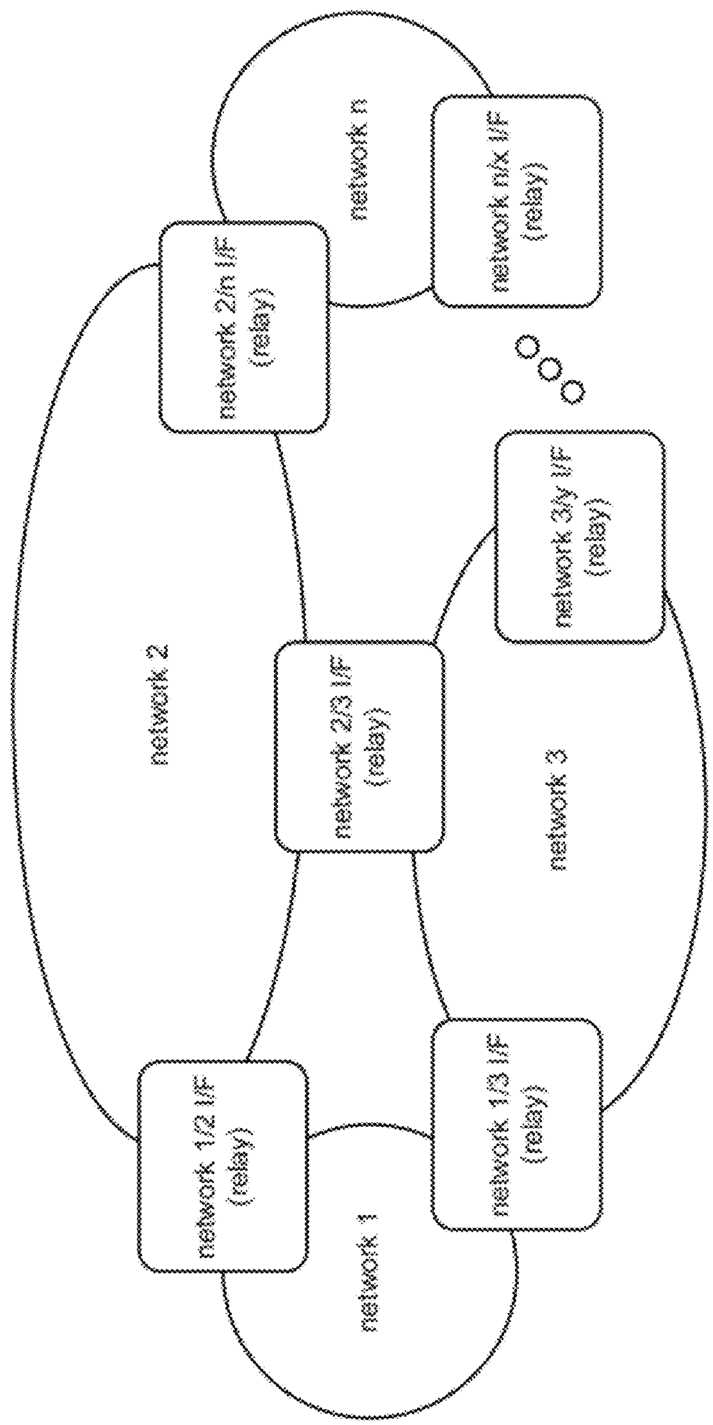

Referring to the embodiment 300 of FIG. 3, such a communication system may generally be viewed as including multiple networks that can interface with each other. Generally speaking, such an embodiment 300 can include a network 1, a network 2, a network 3, and so on up to a network n (e.g., where n is an integer). Such an overall communication system, composed of multiple networks, can generally be referred to as a convergent network (e.g., in which multiple networks are converged with one another thereby generating or forming a larger communication system, namely, a convergent network).

To interface communications between the respective networks, certain interfaces (e.g., relays, bridges, routers, etc.) may be implemented within certain communication devices that are operative to communication with at least two of the types of network. In some embodiments, a given communication device may include functionality to interface with more than two networks (e.g., 3 networks, 4, networks, etc.). As may be seen in the diagram, an interface by which communications are made between two of the networks is via a network interface (or relay). As some specific examples, communications made between network 1 and network 2 are made via network 1/2 interface (or relay); communications made between network 1 and network 3 are made via network 1/3 interface (or relay); communications made between network n and network x are made via network n/x interface (or relay); and so on.

Generally speaking, for a communication device to support communications with more than one network will typically result in greater functionality and/or complexity of such a communication device. In some embodiments, a given communication device includes functionality to interface with and support communications with, at most, two of the networks within the overall communication system or convergent network.

Of course, some of the communication devices therein only include functionality to interface with and support communications with one of the networks within the overall communication system or convergent network. When such a communication device (e.g., one including functionality to interface with and support communications with one of the networks) communicates with another communication device including functionality to interface with and support communications with another one of the networks, such communications are made via at least one interface (or relay) by which communications are made from one network to another.

The types of networks that the networks 1 to n may represent may be varied. For examples, such networks may be wired networks, wireless network, optical networks, cellular networks, satellite networks, power line based networks, etc. Of course, certain of these networks may not only operate in accordance with different types of media (e.g., wired, wireless [air], optical, etc.), but certain of these networks may operate in accordance with different communication standards, protocols, and/or recommended practices.

Figure 4:
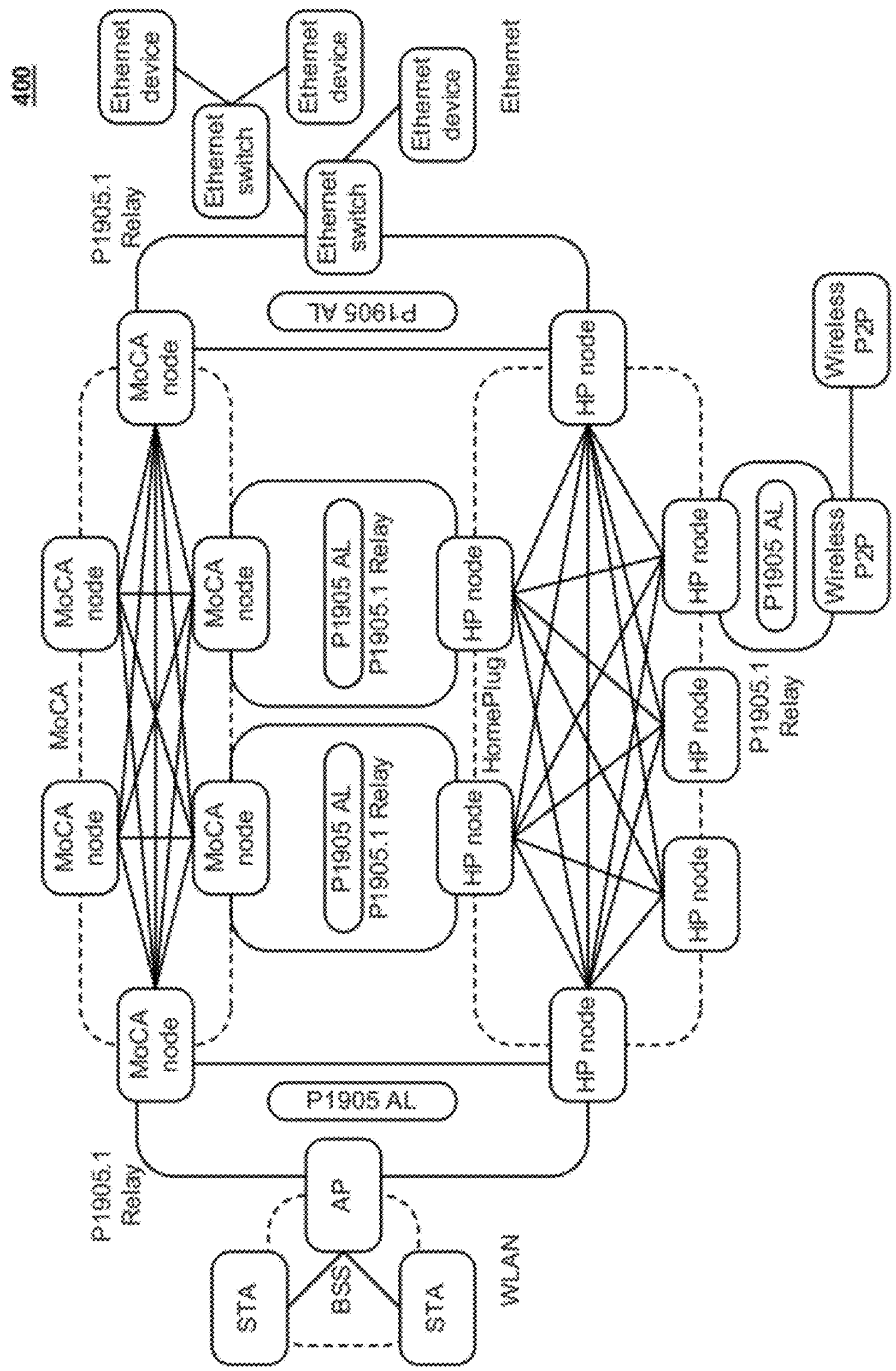

Referring to the embodiment 400 of FIG. 4, such a communication system is a convergent network including interfacing and supporting of communications between various types of communication networks. This diagram particularly depicts a wireless local area network (WLAN/WiFi), a multimedia over coax alliance (MoCA®, or generally referred to as MoCA) network, a local area network (LAN) such as one that operates in accordance with Ethernet or in accordance with IEEE 802.3, a HomePlug network (e.g., a communication network operating in accordance with various power line communication standards, protocols, and/or recommended practices such as being compliant in accordance with at least one version of the IEEE 1901-2010—IEEE Standard for Broadband over Power Line Networks: Medium Access Control and Physical Layer Specifications and can operate using power system related hardware and infrastructure), and/or a wireless point to point (P2P) system (shown as Wireless P2P in the diagram).

Various communication devices are operative to support communications with more than one of these various network types within the overall communication system or convergent network. Such communication devices may generally be referred to as relays that perform the appropriate conversion, transcoding, interfacing, etc. of signals received from and compliant with a first type of network in accordance with generating signals compliant with a second type of network; such a relay then forwards the newly generated signal via the second type of network. It is also noted that such relay functionality may be included within any desired communication device within the convergent network. While certain relays may be dedicated relays within the convergent network, any such type of communication device within the convergent network may include such relaying or interfacing functionality therein.

Of course, certain communications may be transmitted across multiple network interfaces and, as such, may undergo appropriate processing in accordance with more than one relay (e.g., from a first type of network to a second type of network, then from the second type of network to a third second type of network, etc.).

In certain communication devices that includes such relaying or interfacing functionality therein, a P1905.1 Layer may be implemented above the respective media access control (MAC) layers corresponding to two or more network types. For example, a P1905.1 Layer may be implemented above a first MAC layer corresponding to a WLAN and also above a second MAC layer corresponding to a MoCA network. Alternatively, a P1905.1 Layer may be implemented above a first MAC layer corresponding to a LAN or Ethernet network and also above a second MAC layer corresponding to a HomePlug network. Generally, such a P1905.1 Layer may be implemented above at least two MAC layers corresponding respectively to at least two types of networks within the convergent network.

Herein, various means or performing communication of feedback information between various communication devices may be made within any one or more of the types of networks depicted within such convergent networks and/or via any of the particular types of communication media, channels, links, etc. such as described with reference to any such implementations associated with FIG. 1. Generally, such functionality may be broadly and generally applied to any types of communication systems and/or communication networks that interact with one another, including any such combination of the various types of communication systems, communication networks, such as with respect to FIG. 1. Also, the media employed for the various communication links and/or communication channels within such convergent networks may be varied including any one and/or any combination of the various types depicted with reference to FIG. 1.

Figure 5:
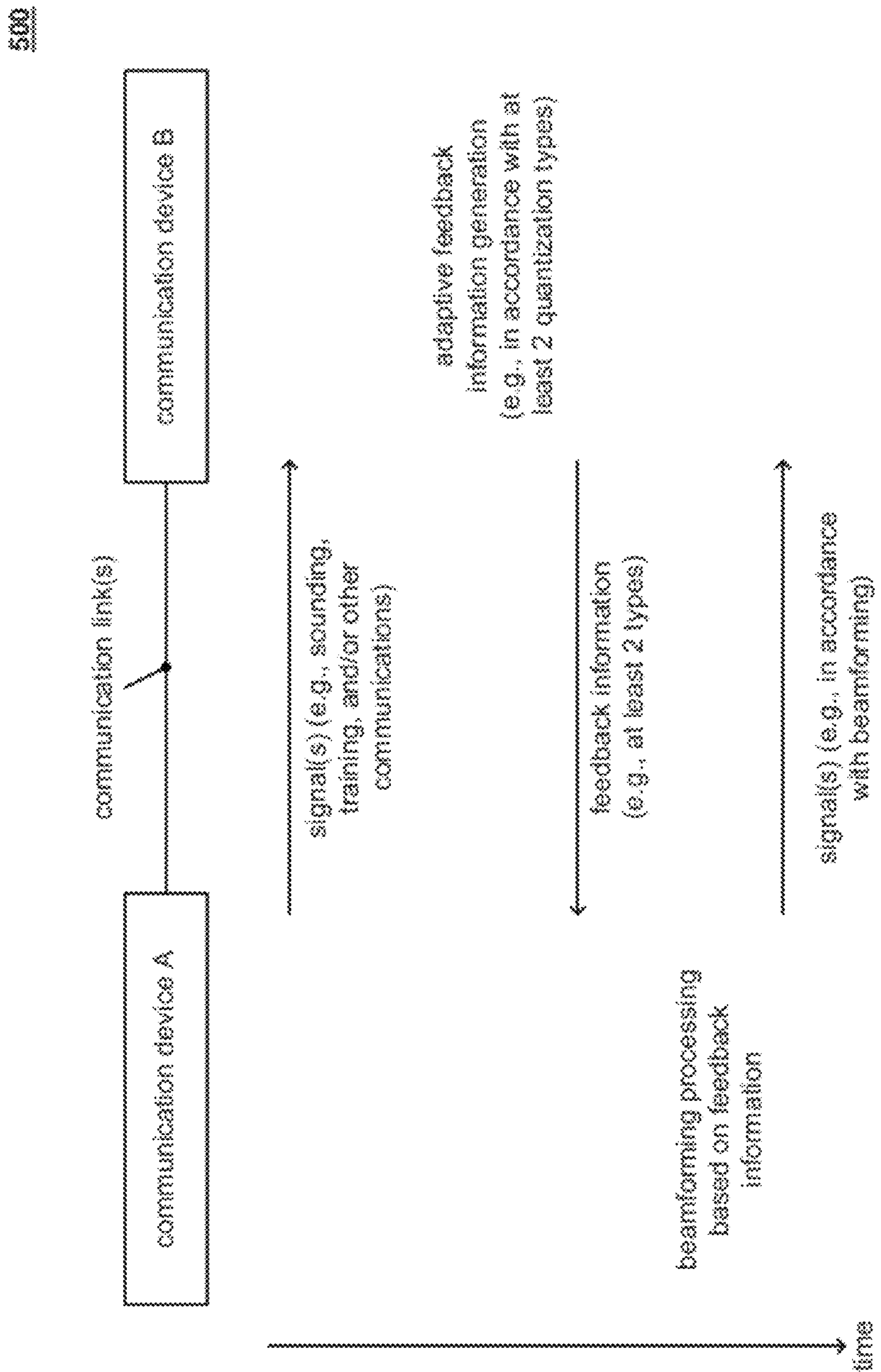
FIG. 5 illustrates an embodiment of various signaling between communication devices.

FIG. 5 illustrates an embodiment of various signaling between communication devices. Generally speaking, to respective communication devices such as communication device A communication device B are able to communicate with one another via signaling provided via one or more communication links. With respect to such communication systems, communications and signaling may often be made between the communication devices using multiple respective paths such that either this same information is concurrently transmitted between the respective communication devices via more than one communication path or different respective information is transmitted between the respective communication devices via more than one communication path.

With respect to this diagram, one or more signals are provided from communication device A to communication device B. Such initial signaling may be sounding, training, and/or other communications that may be used by the communication device B in accordance with adaptive feedback information generation. One or more characteristics associated with these one or more signals provided from the communication device A to communication device B allow for adaptive feedback information generation to be performed by the communication device B. Such one or more signals initially provided from the communication device A to the communication device B may be provided via one or more respective communication pathways by which subsequent communications may be provided later from the communication device A to the communication device B after appropriate beamforming has been made within the communication device A. Appropriate characteristics associated with the particular one or more pathways by which one or more signals are provided from the communication device A to the communication device B may be useful to assist the communication device B in generating feedback information.

For example, the communication device B may include one or more processing modules, functional blocks, circuitries, etc. for adaptively generating feedback information in accordance with more than one quantization type. For example, first feedback information may be adaptively generated in accordance with a first quantization type, and second feedback information may be adaptively generated in accordance with the second quantization type. Different types of information to be provided from the communication device B to the communication device A may respectively have different characteristics. For example, a first type of feedback information may have a respective probability density function (PDF) that is largely or substantially uniform. Another type of feedback information may have a respective PDF that is largely or substantially non-uniform and may have a particular characteristic associated therewith. For example, one example of a non-uniform PDF associated with a type of feedback information may be Gaussian the nature. Of course, other types of non-uniform PDFs may also correspondingly be related to different types of feedback information.

Generally speaking, the communication device B is operative to generate such feedback information adaptively in accordance with different types of quantization based upon characteristics associated with such different types of feedback. For example, considering a first type of feedback having a uniform PDF and a second type of feedback having a non-uniform PDF, the communication device B may generate two different types of feedback information based upon two different respective quantization types. The type of quantization performed by the communication device B in generating such feedback information as well as the actual feedback information (e.g., the actual values as well as their respective quantization type) are then provided from the communication device B to the communication device A. It is noted that such feedback information need not necessarily be provided from the communication device B to the communication device A via the exact same communication links by which the initial one or more signals were provided from the communication device A to the communication device B. However, it is noted that such feedback information may be provided via the same communication links as previously employed in signaling from the communication device A to the communication device B if desired.

Using this received feedback information, the communication device A is operative to perform beamforming processing thereby generating an appropriate beamforming matrix for use in transmitting one or more subsequent signals to the communication device B via the one or more communication the links for which the feedback information was provided from the communication device B.

With respect to communications made from the communication device A to the communication device B via more than one communication pathway, appropriate beamforming will allow for improved and more successful transmission of those communications from the communication device A to the communication device B. Generally, it is a transmitting communication device such as the communication device A that performs the beamforming, but it is a receiving communication device such as the communication device B that provides the appropriate in formation for optimizing such beamforming. Such feedback information is provided via a back channel from the receiving communication device (e.g., communication device B) to the transmitting communication device (e.g., communication device A). Different types of signaling may be effectuated in various types of communication systems. One type of communication signaling is that of OFDM (Orthogonal Frequency Division Multiplexing) modulation such that multiple subcarriers respectively and simultaneously provide information from the transmitting communication device (e.g., communication device A) to the receiving communication device (e.g., communication device B).

Figure 6:
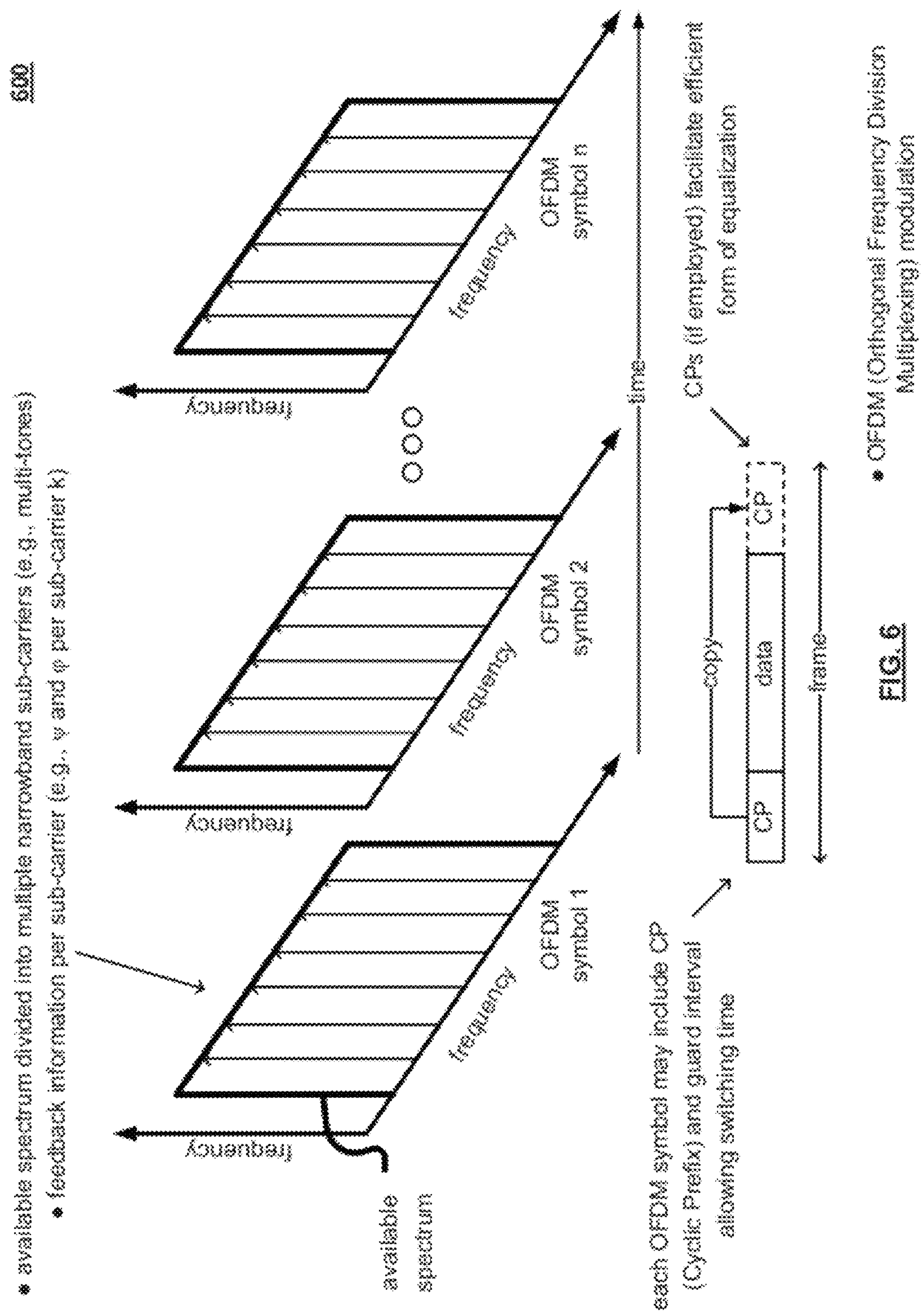
FIG. 6 is a diagram illustrating an embodiment of OFDM (Orthogonal Frequency Division Multiplexing) modulation.

FIG. 6 is a diagram illustrating an embodiment of OFDM (Orthogonal Frequency Division Multiplexing) modulation. OFDM modulation may be viewed a dividing up an available spectrum into a plurality of narrowband sub-carriers (e.g., lower data rate carriers). Typically, the frequency responses of these sub-carriers are overlapping and orthogonal. Each sub-carrier may be modulated using any of a variety of modulation coding techniques.

OFDM modulation operates by performing simultaneous transmission of a larger number of narrowband carriers (or multi-tones). Oftentimes, a guard interval or guard space is also employed between the various OFDM symbols to try to minimize the effects of ISI (Inter-Symbol Interference) that may be caused by certain effects such as multi-path within the communication system (e.g., which can be particularly of concern in wireless communication systems, wired communication systems with multiple pathways or communication links between communication devices, etc.). In addition, in some embodiments, a CP (Cyclic Prefix) may also be employed within the guard interval to allow switching time (when jumping to a new band) and to help maintain orthogonality of the OFDM symbols.

With respect to feedback information provided between communication devices employing OFDM signaling, such feedback information may be provided on a subcarrier by subcarrier basis, such that beamforming will be performed with respect to each subcarrier differently. In certain embodiments, a relatively large number of subcarriers (e.g. several thousand subcarriers such as 2000 subcarriers or 4000 subcarriers) may be employed. As may be understood, a great deal of information may need to be fed back from a receiving communication device to a transmitting communication device.

As described within U.S. Utility patent application Ser. No. 11/168,793, entitled "Reduced feedback for beamforming in a wireless communication," which has been incorporated by reference above, various methodologies and means part disclosed by which such a relatively large amount of information may be fed back in a very efficient way such that a significantly reduced amount of information may be provided which will allow for a transmitting communication device to effectuate appropriate beamforming based thereon. For example, therein, a method and means are defined by which the Beamforming matrix per sub-carrier by 8 bits is proposed. These 8 bits represent two angle values, ψ and ϕ, per each sub-carrier k, that are used by the transmitter to calculate the Beamforming matrix coefficients, as depicted in Eq (1) as follows:

$$V_k = \begin{bmatrix} 1 & 0 \\ 0 & e^{j\phi_k} \end{bmatrix} \begin{bmatrix} \cos\psi_k & \sin\psi_k \\ -\sin\psi_k & \cos\psi_k \end{bmatrix} \quad \text{Eq (1)}$$

Therein, the 8 bits are used to uniformly quantize the two angle values, 5 bits are used to quantize angle ϕ in the [0,2π] range, and 3 bits are used to quantize angle ψ in the [0, π/2].

Herein, non-uniform quantization of the angle ψ may be may to improve the performance of the proposed Beamforming technique by exploiting its non-uniform distribution and its rough quantization (8-levels only). Generally speaking, the inherent non-uniformity of certain types of feedback information may lend itself to non-uniform quantization.

The probability density function (PDF) of the angle ψ is calculated for a large number of random Gaussian channels and for each of a number of different respective tested loops, and a corresponding non uniform quantizer is found using the MAX LLOYD algorithm. Using certain predetermined measured loops, the performance of the Beamforming system with the following three quantization options (as follows) is compared:

1. Uniform Quantization
2. Non-uniform quantization optimized for the distribution of ψ on random Gaussian channels
3. Non-uniform quantization optimized for each loop.

In addition, such adaptively generated feedback information in accordance with a different respective quantization types is also compared with respect to other solutions known in the art, and it can be seen that such adaptively generated feedback information in accordance with in accordance with various aspects, and their equivalents, of the invention provides for improved performance. Also, it is further submitted herewith that the performance of a beamforming system may be improved without increasing the required number of bits needed in transmitting such feedback information.

Figure 7:
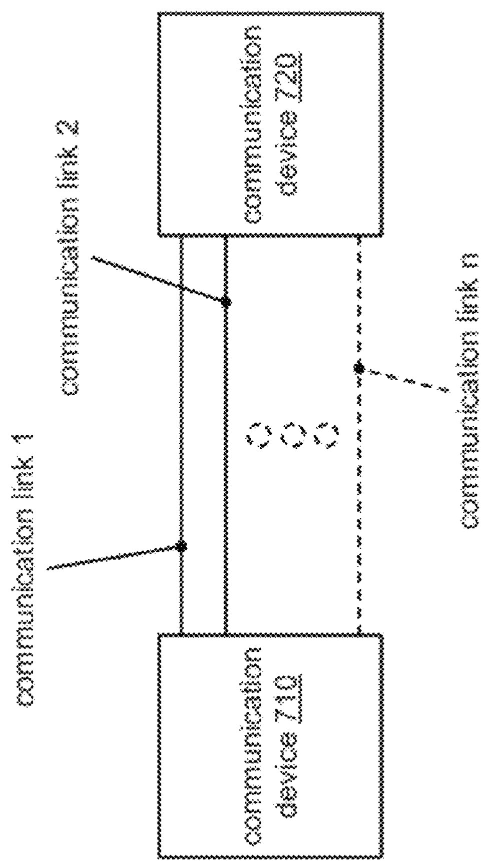
FIG. 7 illustrates an embodiment of multiple communication links between various communication devices.

FIG. 7 illustrates an embodiment 700 of multiple communication links between various communication devices. Generally speaking, a communication device 710 and a communication device 720 may be in communication with one another via two or more respective communication links. Without loss of generality, any number of different respective communication links shown as communication link 1, communication link 2, and so on up to communication link n (where n is any desired number) may be used to effectuate communications between communication devices 710 and 720.

Figure 8:
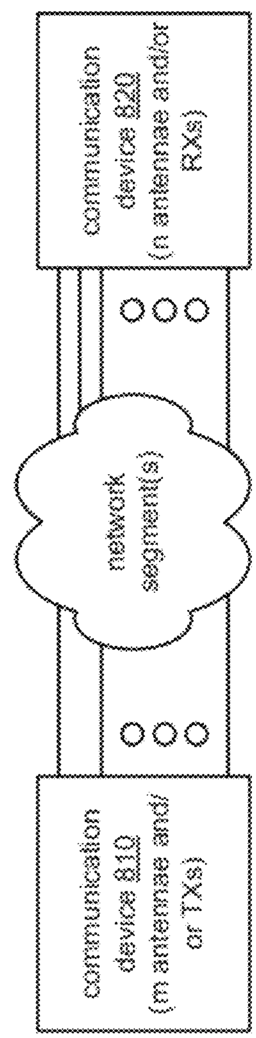
FIG. 8 illustrates an alternative embodiment of multiple communication links between various communication devices.

FIG. 8 illustrates an alternative embodiment of multiple communication links between various communication devices. For example, in some alternative embodiments, there may be instances where the number of transmitters and/or antennae in a transmitting communication device (e.g., communication device 810) may be different than the number of receivers and/or antennae in a receiving communication device (e.g., communication device 820), such that communications there between are made via one or more communication networks and/or network segments. In such an embodiment, the number of communication links may be m×n. Generally speaking, such communication links may be made in accordance with any one or more of a variety of types of communication media (e.g., wired, wireless, fiber-optic, etc. and/or any combination thereof etc. including any of those depicted with respect to FIG. 1, among other embodiments and/or diagrams) without departing from the scope and spirit of the invention.

In accordance with transmissions made via more than one communication link between the communication devices 710 and 720 in FIG. 7 and/or 810 and 820 in FIG. 8, appropriate beamforming may be performed to ensure improved transmission and reception within the communication system.

Figure 9:
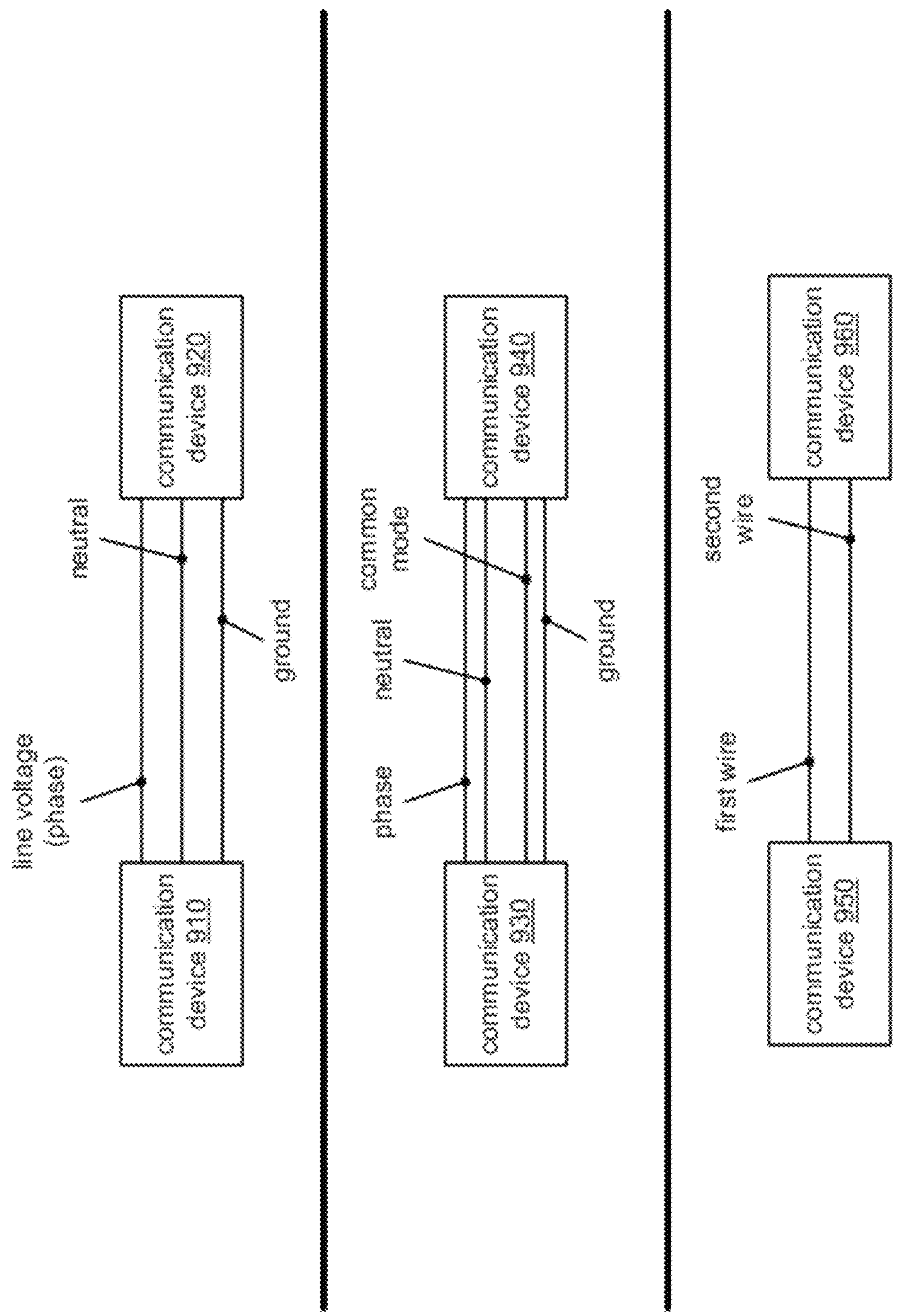
FIG. 9 illustrates various embodiments of connectivity between various communication devices as may be encountered in alternative implementations of wired communication systems such as those implemented in accordance with PLC/HP (Powerline/HomePlug).

FIG. 9 illustrates various embodiments 900 of connectivity between various communication devices as may be encountered in alternative implementations of wired communication systems such as those implemented in accordance with PLC/HP (Powerline/HomePlug).

Referring to the top of the diagram, a communication device 910 and a communication device 920 may be in connectivity via a three wired system, such that communications are effectuated via two or more of the three available possible communication links (e.g., line voltage (phase), neutral, ground (protective Earth)) within the such a PLC/HP type communication system.

Referring to the middle of the diagram, a communication device 930 and a communication device 940 may be in connectivity via a four wired system, such that communications are effectuated via two or more of the four available possible communication links (e.g., phase, neutral, common mode, ground (protective Earth)) within the such a PLC/HP type communication system.

Referring to the bottom of the diagram, a communication device 950 and a communication device 960 may be in connectivity via a two pair system, such that communications are effectuated via the two communication links (e.g., first wire and second wire being phase and neutral, or first wire and second wire being phase and ground (protective Earth), etc.) within the such a PLC/HP type communication system.

As may be understood with respect to any desired such a communication system embodiment in which communications are made via more than one communication link between the communication devices, appropriate beamforming may be performed to ensure improved transmission and reception within the communication system.

Figure 10:
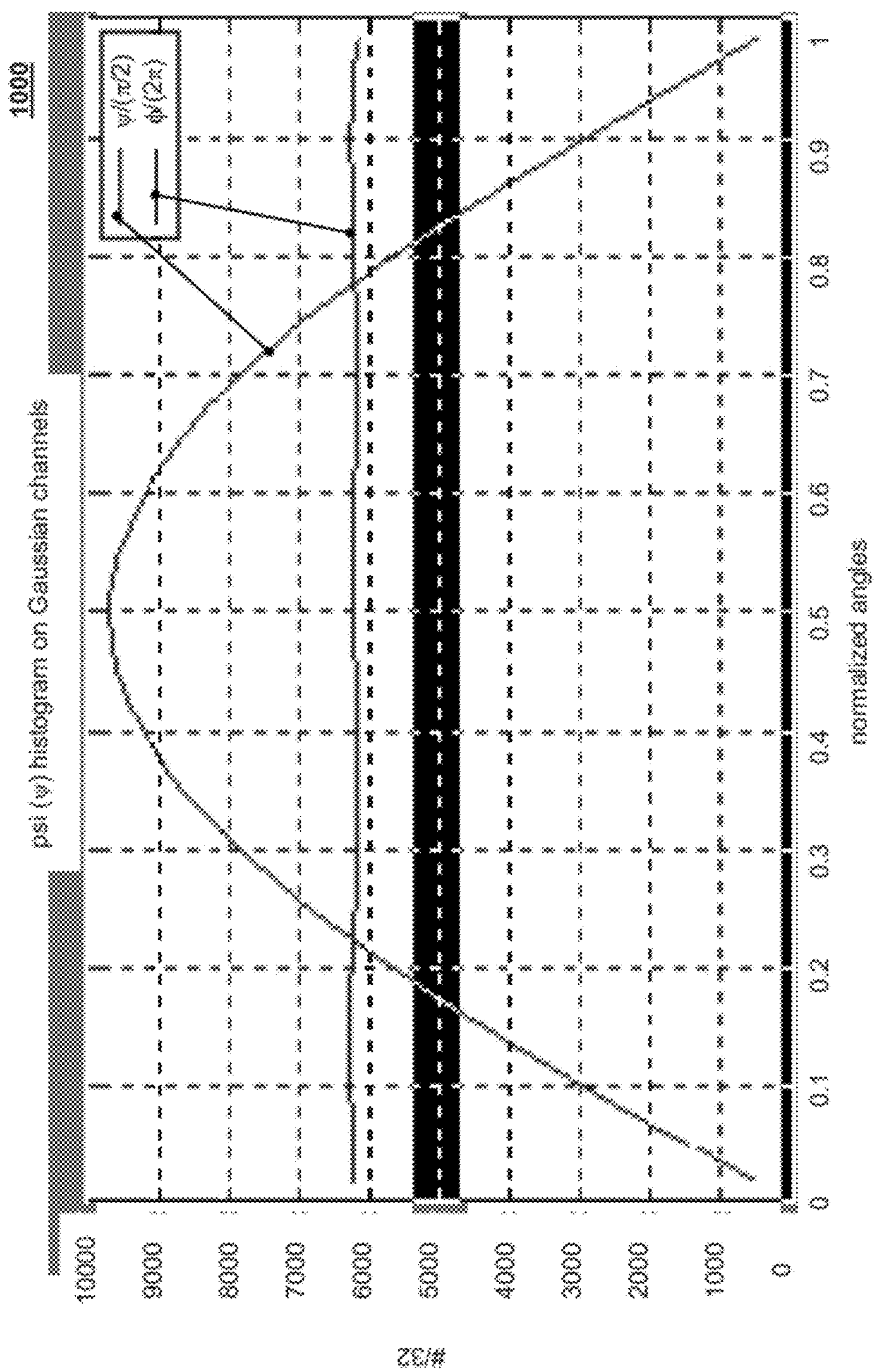
FIG. 10 illustrates an embodiment of histogram of angles on 100 k Gaussian channels.

FIG. 10 illustrates an embodiment 1000 of histogram of angles on 100 k Gaussian channels. With respect to determining improved or optimal quantization over certain types of feedback information, characteristics associated with the type of feedback information is useful. For example, in order to find a PDF of the angles $\psi$ and $\phi$, the beamforming feedback matrix, or the V-matrix, for 100,000 Gaussian random 2×2 channels was calculated. This diagram depicts the distribution (histogram) of the two respective angles, $\psi$ and $\phi$. As may be seen within the diagram, the $\phi$ angles have a uniform distribution over its respective range, while the $\psi$ angles have a non-uniform distribution. Further, it may be observed that the $\psi$ angles have a truncated Gaussian probability density function (PDF). The mean or average of the $\psi$ angles is $\pi/4$ having a standard deviation of $\pi/10$.

Figure 11:
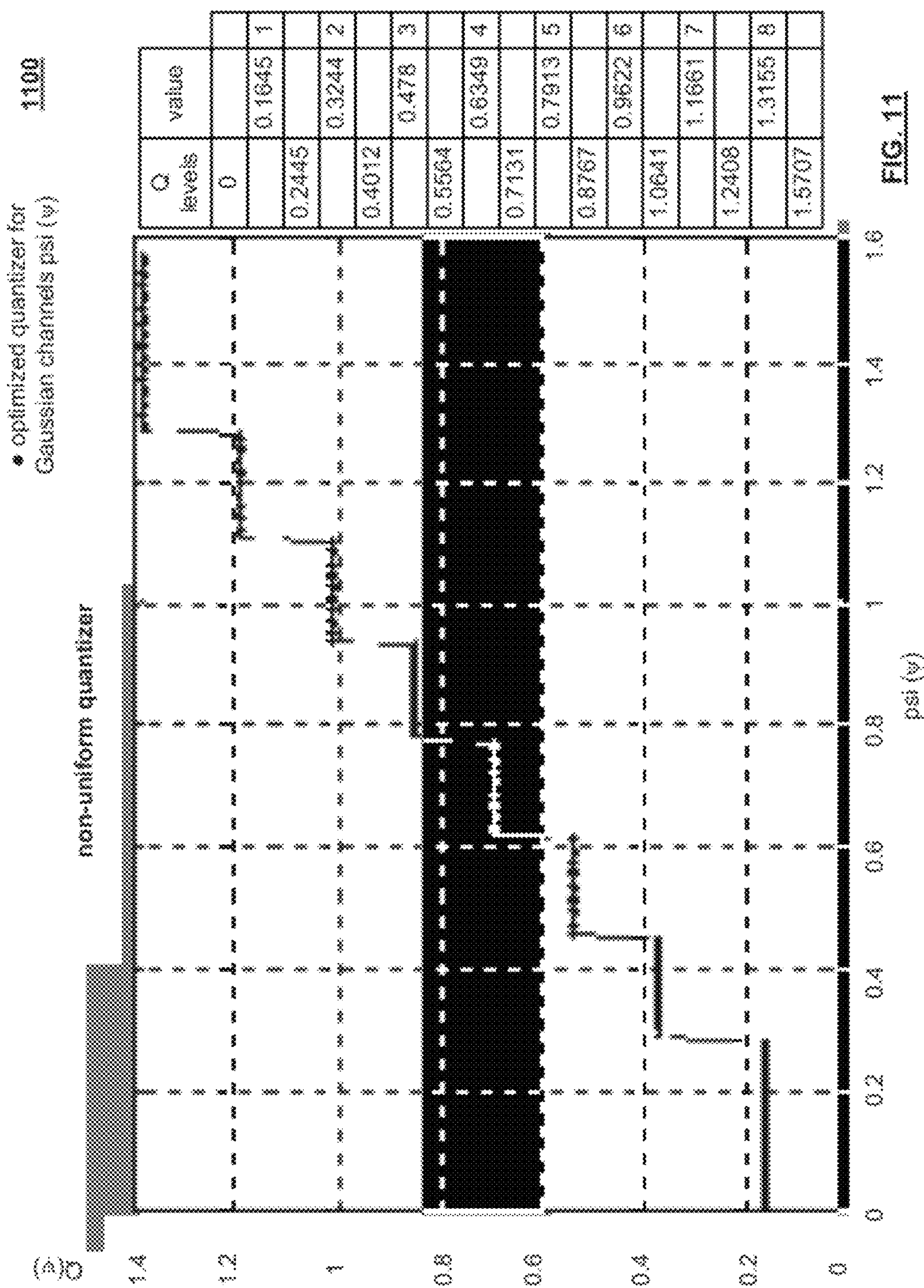
FIG. 11 illustrates an embodiment of an optimized quantizer for Gaussian distributed psi (ψ).

FIG. 11 illustrates an embodiment 1100 of an optimized quantizer for Gaussian distributed psi ($\psi$). This diagram shows the optimal non-uniform Gaussian quantizer based upon the truncated Gaussian PDF associated with the $\psi$ angles shown with reference to FIG. 10.

In empirical studies, in accordance with confirming the advantage in performance as provided with an optimal quantizer, the signal to noise ratio (SNR) after equalization was simulated for 10,000 channels with and without optimal quantization. The results showed an improvement of about 1 dB due to optimal quantization, as shown with respect to the following:

on 10,000 channels, the average SNR a first path

SNR (8 bits, uniform quantized)=27.4 dB

SNR (8 bits, psi ($\psi$) angles non-uniform quantized)=28.4 dB as may be understood with respect to the quantization made with respect to different types of feedback information, uniform quantization, non-uniform quantization (e.g., such as with respect to feedback information having a Gaussian PDF), or optimal quantization on a per bit loop basis may be made. For example, in addition to the "Global" Gaussian distribution quantization, the optimal quantization per each respective one of a number of tested loops may be calculated using the Max Lloyd algorithm. In implementation, such optimal quantization may be done during channel sounding, such as by calculating the $\psi$ angles of each respective test loop and finding the corresponding optimal quantizer therefore. In addition, the respective number and/or of the values of quantization levels must be communicated from a receiver communication device to a transmitter communication device. In an embodiment in which three bits are used for such quantization, and for which there are consequently eight respective quantization levels, that information must be communicated from the receiver communication device to the transmitter communication device.

Various respective simulations have been made based upon a number of simulation conditions.

Measured multiple-input-multiple-output (MIMO) 2×2 loops (e.g., measurements used in these simulations were taken in real homes in Europe)

Transmitter power spectral density (PSD) mask: AV2 mask up to 50 MHz transmitter power to received noise ratio: 20 to 60 dB symbol duration: 46.52 μs (Nfft=4096, CP=556)

code rate: 11/16 optimal channel estimation in zero forcing equalizer (ZFE) calculations

The simulations were made based upon the assumption of optimal channel estimation and ZFE. The transmitted signal and received additive white Gaussian noise (AWGN) were simulated for the means squared error (MSE) for each respective receiver measured and used to calculate the physical layer (PHY) rate according to the equation as follows among other considerations:

PHY rate=sum(bit loading)/symbol duration×code rate

With respect to simulation results, the PHY rate as a function of the TX power to RX noise ratio on all tested loops are depicted in the figures in the Appendix, and are summarized in the tables below for the case of TX power to RX noise ratio of 50 dB. The following quantization options are compared:

1. "Optimal $\psi$ quantization" (16 bits)
2. 12-bit with $\psi$ and $\phi$ uniformly quantized
3. 12-bit with $\psi$ non-uniformly quantized and $\phi$ uniformly quantized
4. 8-bit $\psi$ and $\phi$ uniformly quantized
5. 8-bit with $\psi$ non-uniformly quantized and $\phi$ uniformly quantized FIG. 12 illustrates an embodiment 1200 of a table for physical layer (PHY) rate loop performance using 8 bits where transmit power to received noise ratio is 50 dB. This table depicts the PHY rates on the measured loops with 8-bit angle information and uniform and non-uniform quantization of $\psi$. For non-uniform quantization, the fixed Gaussian quantizer and the adaptive quantizer per loop were considered. The relative increase in PHY rate for the two non-uniform quantizers over the uniform quantizer are depicted in the two right most columns.

The results show that on some of the loops there is a significant improvement in the PHY rate, of 5.0% plus, with the Gaussian quantizer. The adaptive quantizer provides further improvement of the PHY rates on bad loops. Overall, 5 out of the 13 loops showed improvement of more than 7% in the available throughput when using non-uniform quantization for $\psi$.

As may be understood, the usage of non-uniformed quantization for angle $\psi$ and its performance implications, using the measured loops and random Gaussian loops, has been studied.

Simulations showed improvement of 7%+ and more in PHY rate and up to 1.5 dB in SNR on some of the measured loops using the 8-bit angle representation ($\psi$ is represented by 3-bits).

Fixed and adaptive quantizers were also simulated, and the results showed a benefit in performance to the adaptive quantizer on bad loops. Since the quantizer is a 3-bit quantizer (e.g., only eight (8) quantization levels exist), the adaptive quantization levels can be communicated to the transmitter as part of the sounding feedback with negligible increase in overhead.

As may be understood in accordance with in accordance with various aspects, and their equivalents, of the invention, a certain number of bits (e.g., 8 bits in one embodiment) may be used to represent respective angles such that at least some of the information provided as feedback information is implemented using non-uniform quantization. For example, and 8-bit angle representation may be employed with non-uniform three bit ψ quantization. The ψ quantization may be either fixed or adapted to a respective loop, and such quantization may be implementation specific. Moreover, with respect to non-uniform quantization being performed with respect to at least some of the feedback information, the respective quantization levels may be provided from a receiver communication device to a transmitter communication device (e.g., such as in accordance with the sounding message). For example, in an implementation in which three bits are employed in accordance with non-uniform quantization, the corresponding eight respective quantization levels may be provided from a receiver communication device to a transmitter communication device.

Figure 13:
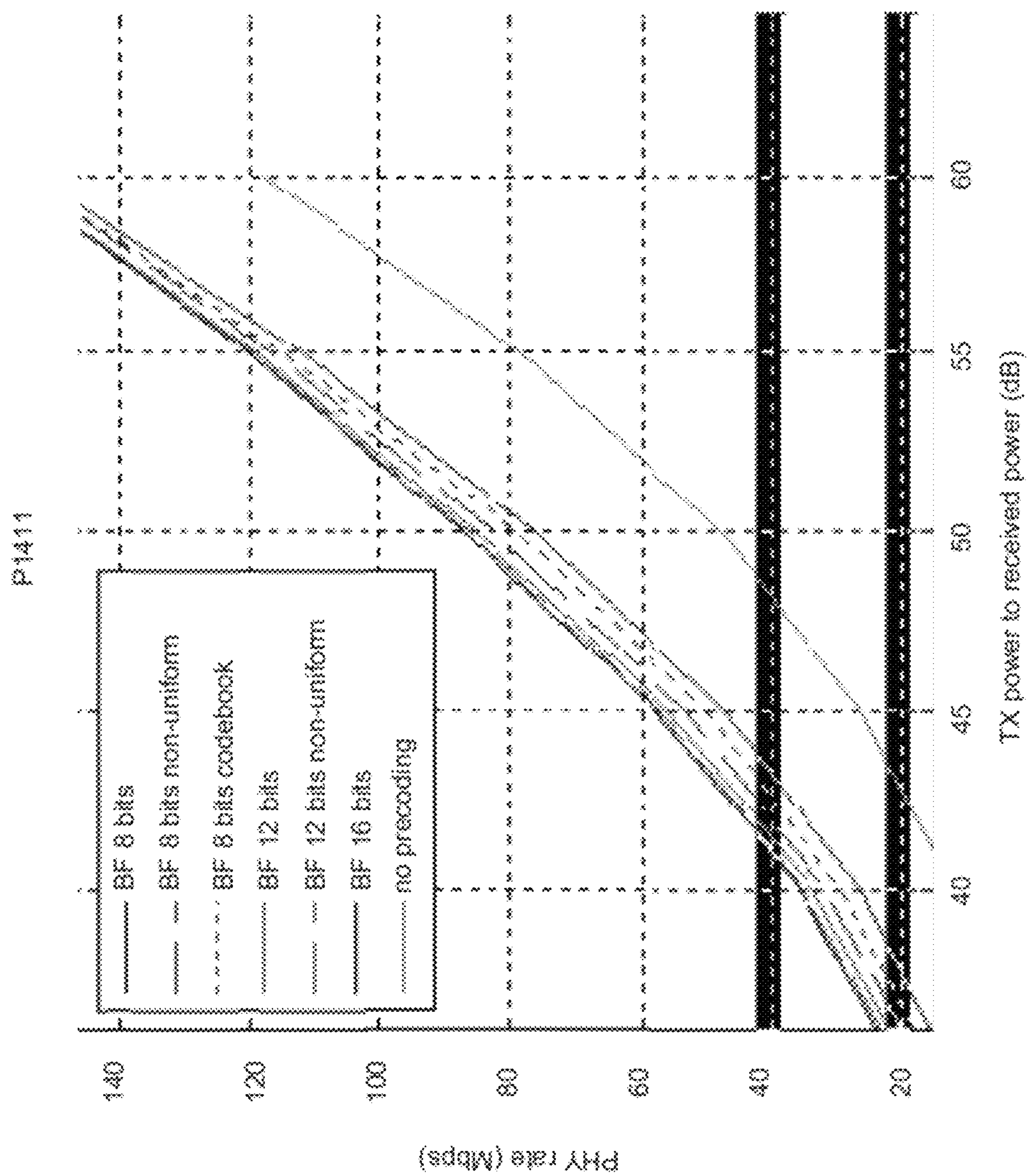
FIG. 13 and FIG. 14 illustrate, with different respective degrees of granularity, an embodiment of performance comparisons of different respective types of quantization used for feedback information based on a first loop within a wired communication system (e.g., implemented in accordance with PLC/HP (Powerline/HomePlug)).
Figure 14:
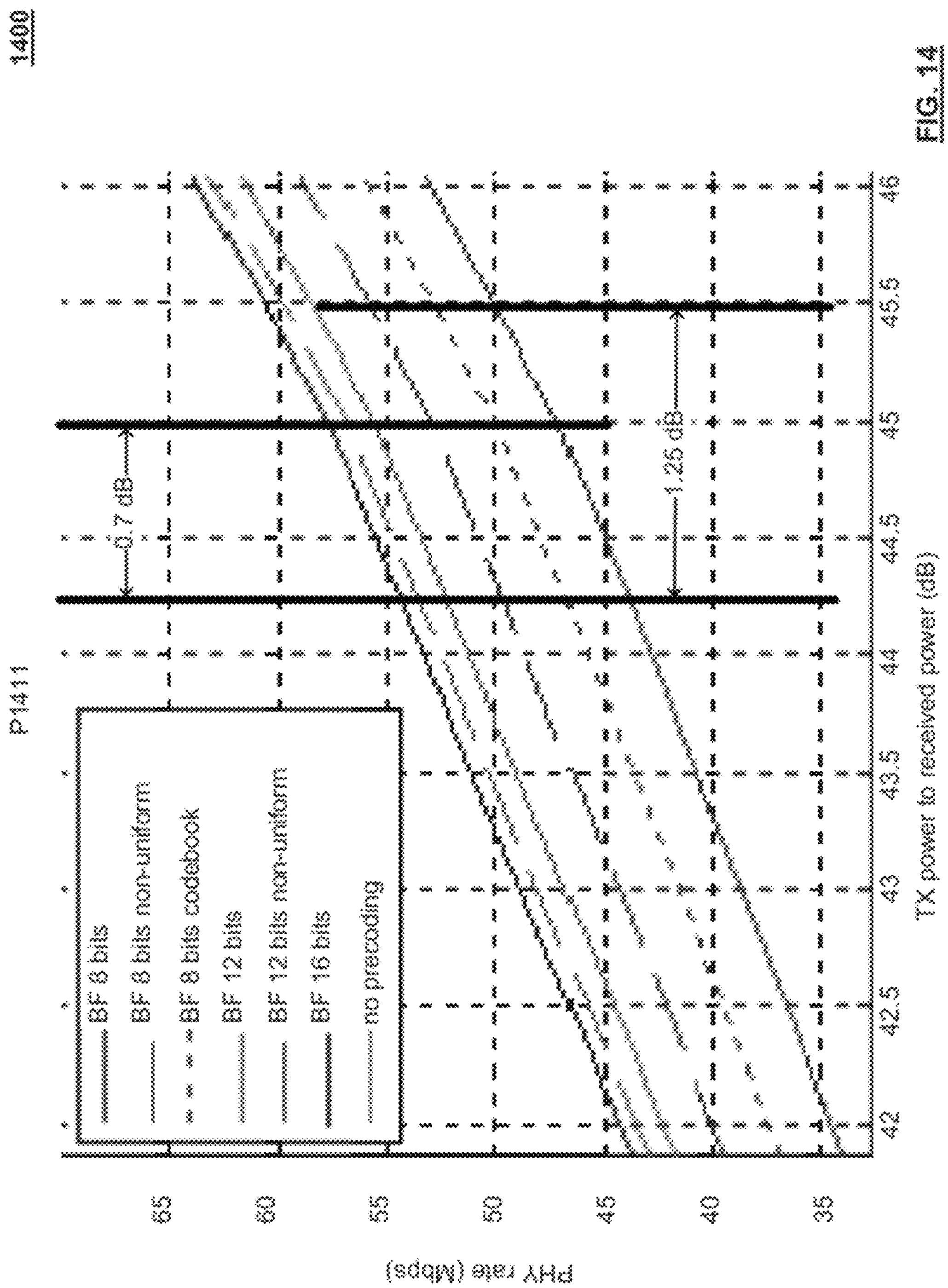

FIG. 13 and FIG. 14 illustrate, with different respective degrees of granularity, an embodiment 1300/1400 of performance comparisons of different respective types of quantization used for feedback information based on a first loop within a wired communication system (e.g., implemented in accordance with PLC/HP (Powerline/HomePlug)).

As may be seen with respect to comparing different quantization types, adaptively generated feedback information in accordance with different respective quantization types, significant performance improvement may be made in comparison to embodiments that do not employ adaptively generated feedback information with different respective quantization.

Figure 15:
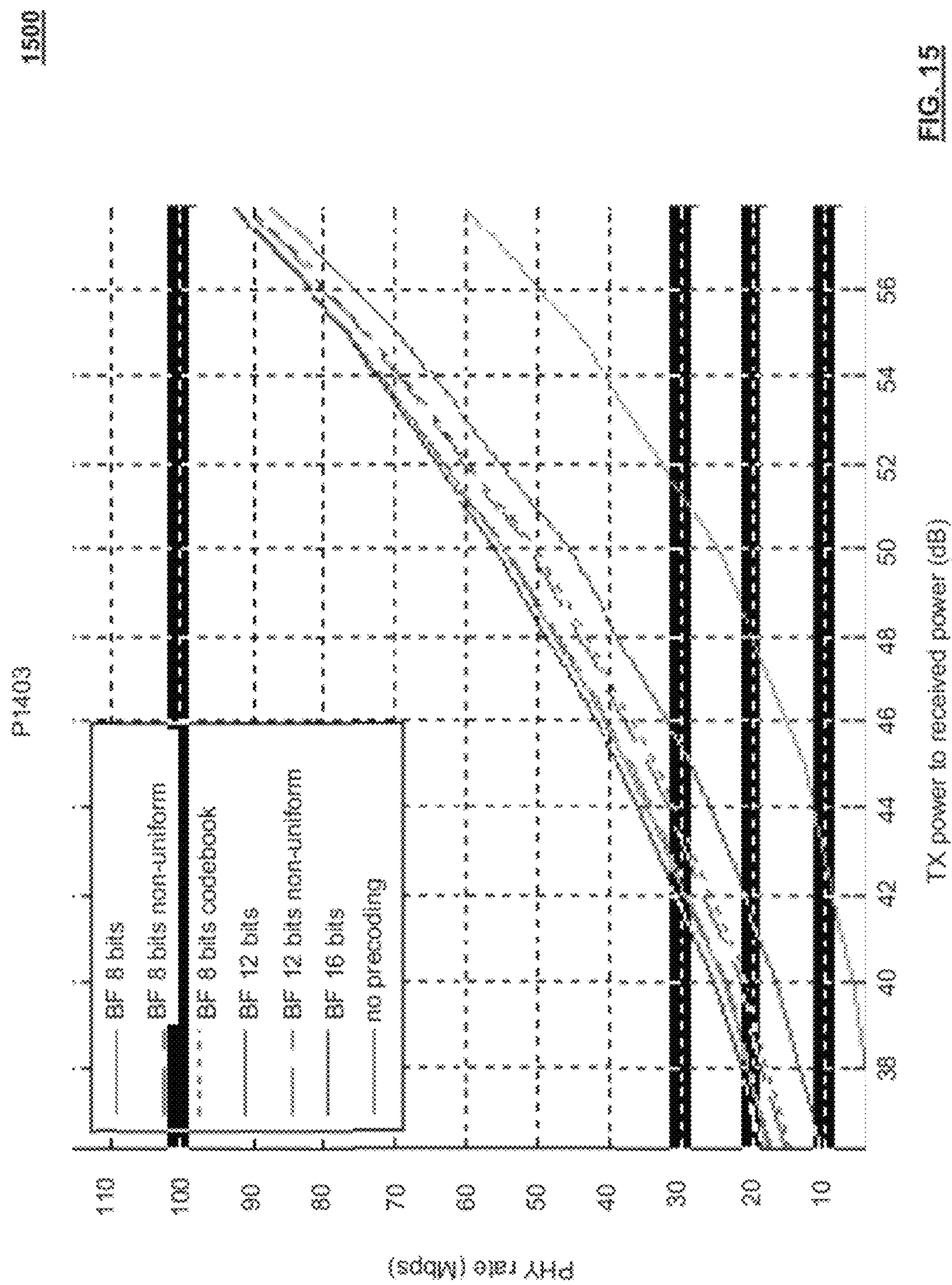
FIG. 15 and FIG. 16 illustrate, with different respective degrees of granularity, an embodiment of performance comparisons of different respective types of quantization used for feedback information based on a first loop within a wired communication system (e.g., implemented in accordance with PLC/HP (Powerline/HomePlug)).
Figure 16:
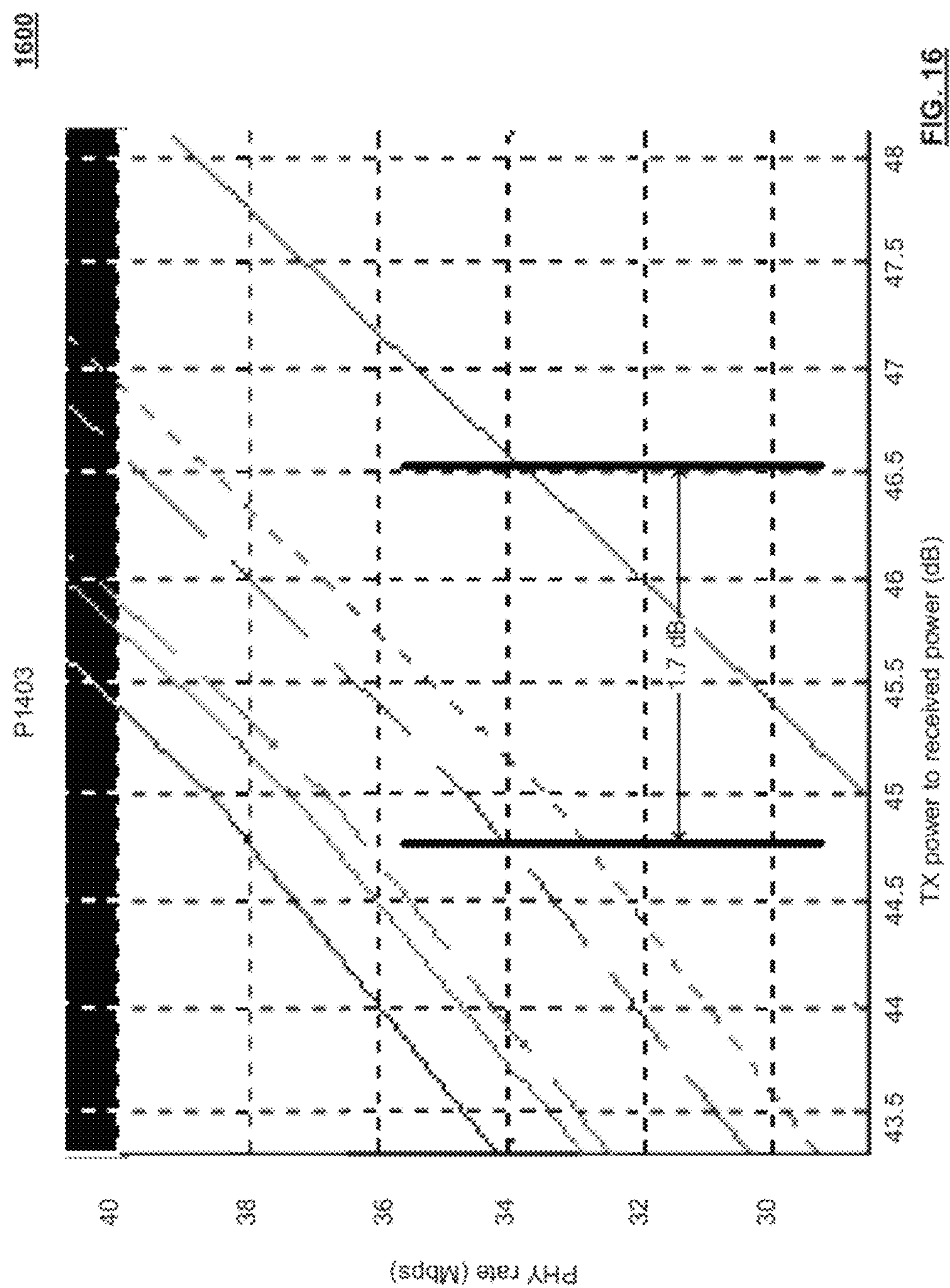

FIG. 15 and FIG. 16 illustrate, with different respective degrees of granularity, an embodiment 1500/1600 of performance comparisons of different respective types of quantization used for feedback information based on a first loop within a wired communication system (e.g., implemented in accordance with PLC/HP (Powerline/HomePlug)).

Again, even with respect to another test loop, as may be seen with respect to comparing different quantization types, adaptively generated feedback information in accordance with different respective quantization types, significant performance improvement may be made in comparison to embodiments that do not employ adaptively generated feedback information with different respective quantization.

Figure 18:
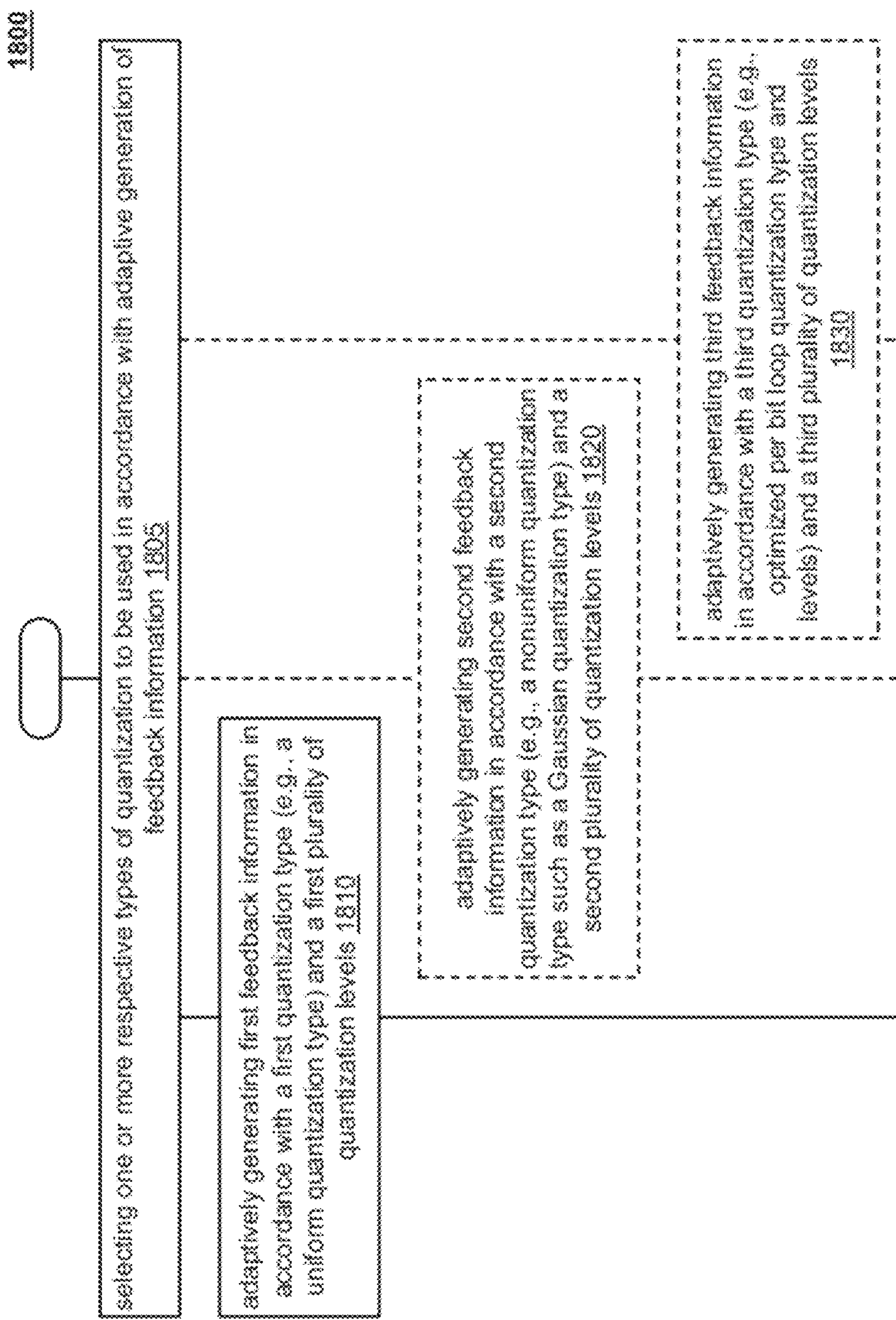

FIG. 17A, FIG. 17B, and FIG. 18 illustrate various embodiments of methods for operating one or more communication devices.

Referring to method 1700 of FIG. 17A, the method 1700 begins by receiving, via at least one communication interface of the communication device, a signal from at least one additional communication device the at least one communication network, as shown in a block 1710.

The method 1700 continues by adaptively generating feedback information in accordance with a quantization type, selected from a plurality of quantization types (e.g., which may include at least one uniform quantization type and at least one non-uniform quantization type), and in accordance with a plurality of quantization levels based on at least one characteristic associated with the signal, as shown in a block 1720. For example, in certain embodiments, one or more characteristics associated with the received signal may result in any of a number of different types of feedback information having different types of characteristics being generated. In one embodiment, as few as one feedback information is adaptively generated in accordance with one quantization type and in accordance with one group of quantization levels (e.g., being of a non-uniform quantization type or a uniform quantization type). In other embodiments, two feedback informations may be adaptively generated in accordance with one or two quantization types and in accordance with one or two different groups of quantization levels (e.g., both being of a non-uniform quantization type or a uniform quantization type, or one being of a non-uniform quantization type and the other being of a uniform quantization type). For example, some feedback information may have the uniform distribution, and other feedback information may have a non-uniform distribution. Adaptively generating different respective types of feedback information in accordance with different types of quantization may be performed.

Via the at least one communication interface of the communication device, the method 1700 then operates by transmitting the feedback information in accordance with the selected quantization type and the plurality of quantization levels to the at least one additional communication device via the at least one communication network, as shown in a block 1730. For example, not only are the actual quantized values transmitted from a receiving communication device to a transmitting communication device, but the types of quantization associated with those quantizer values (e.g., the quantization levels which may have characteristics of different types including those being non-uniformly or uniformly distributed) may also be transmitted via the back channel from the receiving communication device to the transmitting communication device. As such, the transmitting communication device, or the beamformer, will not only have the quantized values associated with different types of feedback information, but will appropriately know how to decipher those quantized values (e.g., in accordance with the associated quantization levels). In the instance of employing non-uniform quantization, the respective quantization levels may also be provided from the receiving communication device to the transmitting communication device.

Referring to method 1701 of FIG. 17B, the method 1701 begins by receiving, via at least one communication interface of the communication device, a signal from at least one additional communication device the at least one communication network, as shown in a block 1711. The method 1701 then operates by adaptively generating first feedback information in accordance with a first number of bits per value and second feedback information in accordance with a second number of bits per value, as shown in a block 1721. For example, the respective quantized values which are actually provided in accordance with feedback information may respectively be represented using different respective numbers of bits.

Via the at least one communication interface of the communication device, the method 1701 then operates by transmitting the first feedback information and the second feedback information to the at least one additional indication device via the at least one communication network, as shown in a block 1731.

Referring to method 1800 of FIG. 18, the method 1800 begins by selecting one or more respective types of quantization to be used in accordance with adaptive generation of feedback information, as shown in a block 1805. Based upon such selection of one or more respective types of quantization, the method 1800 operates by performing any one or more of the respective operations shown within the blocks 1810, 1820, and 1830.

In accordance with the operations associated with a block 1810, the method 1800 operates by adaptively generating first feedback information in accordance with a first quantization type (e.g., a uniform quantization type) and a first plurality of quantization levels. In accordance with the operations associated with a block 1820, the method 1800 operates by adaptively generating second feedback information in accordance with a second quantization type (e.g., a non-uniform quantization type such as a Gaussian quantization type) and a second plurality of quantization levels. In accordance with the operations associated with a block 1830, the method 1800 operates by adaptively generating third feedback information in accordance with a third quantization type (e.g., optimized per bit loop quantization type and levels such as in accordance with any of a predetermined or predefined quantization type, one which is adaptively determined, etc.) and a third plurality of quantization levels. It is of course noted that any one of the operations within the blocks 1810, 1820, and 1830 may be performed in a desired embodiment. In certain, only the operations within one of the blocks 1810, 1820, and 1830 are performed.

In some embodiments, such a processing module can perform such processing to generate signals for transmission using at least one of any number of transmitters and/or radios and at least one of any number of communication interfaces, ports, and/or antennae to another communication device (e.g., which also may include at least one of any number of transmitters and/or radios and at least one of any number of communication interfaces, ports, and/or antennae) in accordance with various aspects of the invention, and/or any other operations and functions as described herein, etc. or their respective equivalents. In some embodiments, such processing is performed cooperatively by a first processing module in a first device, and a second processing module within a second device. In other embodiments, such processing is performed wholly by a processing module implemented within one given device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A wireless communication device comprising:

a communication interface; and a processor, the processor and the communication interface configured to:

receive a multiple-input-multiple-output (MIMO) orthogonal frequency division multiplexing (OFDM) transmission from another wireless communication device via a wireless communication channel;

process the MIMO OFDM transmission to generate a plurality of channel matrices for a plurality of OFDM sub-carriers that corresponds to the wireless communication channel;

determine, based on the plurality of channel matrices for the plurality of OFDM sub-carriers, a first plurality of angles for a plurality of OFDM sub-carriers of the MIMO OFDM transmission using uniform quantization based on a first number of quantization bits;

determine, based on the plurality of channel matrices for the plurality of OFDM sub-carriers, a second plurality of angles for the plurality of OFDM sub-carriers of the MIMO OFDM transmission using uniform quantization based on a second number of quantization bits that is different than the first number of quantization bits, wherein the first plurality of angles and the second plurality of angles correspond to a plurality of beamforming matrices for plurality of OFDM sub-carriers for use by the another wireless communication device to make a subsequent MIMO OFDM transmission to the wireless communication device; and transmit the first plurality of angles and the second plurality of angles to the another wireless communication device.

2. The wireless communication device of claim 1, wherein the processor and the communication interface are further configured to:

receive another MIMO OFDM transmission from the another wireless communication device via the wireless communication channel, wherein the another MIMO OFDM transmission is beamformed for the wireless communication device based on the first plurality of angles and the second plurality of angles.

3. The wireless communication device of claim 1, wherein the processor is further configured to:

receive another MIMO OFDM transmission from the another wireless communication device via the wireless communication channel;

process the another MIMO OFDM transmission to generate another plurality of channel matrices for the plurality of OFDM sub-carriers that corresponds to the wireless communication channel;

determine, based on the another plurality of channel matrices for the plurality of OFDM sub-carriers, a third plurality of angles for the plurality of OFDM sub-carriers of the MIMO OFDM transmission using uniform quantization based on a third number of quantization bits;

determine, based on the another plurality of channel matrices for the plurality of OFDM sub-carriers, a fourth plurality of angles for the plurality of OFDM sub-carriers of the MIMO OFDM transmission using uniform quantization based on a fourth number of quantization bits that is different than the third number of quantization bits, wherein the third plurality of angles and the fourth plurality of angles correspond to another plurality of beamforming matrices for plurality of OFDM sub-carriers for use by the another wireless communication device to make another subsequent MIMO OFDM transmission to the wireless communication device; and transmit the third plurality of angles and the fourth plurality of angles to the another wireless communication device.

4. The wireless communication device of claim 1, wherein the MIMO OFDM transmission a channel sounding transmission or a channel training transmission.

5. The wireless communication device of claim 1, wherein the wireless communication device is operative within a convergent network that includes a wireless local area network (WLAN) and a wired communication network.

6. The wireless communication device of claim 1, wherein the processor is further configured to:

receive the MIMO OFDM transmission via 2 antennas of the wireless communication device, wherein the MIMO OFDM transmission is a 2×2 transmission that includes a plurality of streams transmitted via 2 antennas of the another wireless communication device via the wireless communication channel.

7. The wireless communication device of claim 1, wherein the processor is further configured to:

receive the MIMO OFDM transmission via n antennas of the wireless communication device, wherein the MIMO OFDM transmission is an m×n transmission that includes a plurality of streams transmitted via m antennas of the another wireless communication device via the wireless communication channel, wherein n is a first positive integer and m is a second positive integer that is different than n.

8. The wireless communication device of claim 1, wherein the processor and the communication interface are further configured to:

support communications within at least one of a satellite communication system, a cable communication system, a telephone communication system, a wireless communication system, a wired communication system, or a fiber-optic communication system.

9. A communication device comprising:

a communication interface; and a processor, the processor and the communication interface configured to:

transmit a first multiple-input-multiple-output (MIMO) orthogonal frequency division multiplexing (OFDM) transmission to another wireless communication device via a wireless communication channel;

receive a first plurality of angles and a second plurality of angles from the another wireless communication device, wherein the first plurality of angles are for a plurality of OFDM sub-carriers of the first MIMO OFDM transmission as generated by the another wireless communication device using uniform quantization based on a first number of quantization bits and the second plurality of angles are for the plurality of OFDM sub-carriers of the first MIMO OFDM transmission using uniform quantization based on a second number of quantization bits that is different than the first number of quantization bits;

generate a plurality of beamforming matrices for the plurality of OFDM sub-carriers using the first plurality of angles and the second plurality of angles;

generate a second MIMO OFDM transmission based on the plurality of beamforming matrices for the plurality of OFDM sub-carriers; and transmit the second MIMO OFDM transmission to the another wireless communication device via a wireless communication channel.

10. The wireless communication device of claim 9, wherein the processor and the communication interface are further configured to:

transmit a third MIMO OFDM transmission to the another wireless communication device via the wireless communication channel;

receive a third plurality of angles and a fourth plurality of angles from the another wireless communication device, wherein the third plurality of angles are for a plurality of OFDM sub-carriers of the third MIMO OFDM transmission as generated by the another wireless communication device using uniform quantization based on a third number of quantization bits and the fourth plurality of angles are for the plurality of OFDM sub-carriers of the third MIMO OFDM transmission using uniform quantization based on a fourth number of quantization bits that is different than the third number of quantization bits;

generate another plurality of beamforming matrices for the plurality of OFDM sub-carriers using the third plurality of angles and the fourth plurality of angles;

generate a fourth MIMO OFDM transmission based on the plurality of beamforming matrices for the plurality of OFDM sub-carriers; and transmit the fourth MIMO OFDM transmission to the another wireless communication device via the wireless communication channel.

11. The wireless communication device of claim 9, wherein the wireless communication device is operative within a convergent network that includes a wireless local area network (WLAN) and a wired communication network.

12. The wireless communication device of claim 9, wherein the processor is further configured to:

transmit the first MIMO OFDM transmission via 2 antennas of the wireless communication device, wherein the first MIMO OFDM transmission is a 2×2 transmission that includes a plurality of streams transmitted to 2 antennas of the another wireless communication device via the wireless communication channel.

13. The wireless communication device of claim 9, wherein the processor and the communication interface are further configured to:

support communications within at least one of a satellite communication system, a cable communication system, a telephone communication system, a wireless communication system, a wired communication system, or a fiber-optic communication system.

14. A method for execution by a communication device, the method comprising:

receiving, via a communication interface of the wireless communication device, a multiple-input-multiple-output (MIMO) orthogonal frequency division multiplexing (OFDM) transmission from another wireless communication device via a wireless communication channel;

processing the MIMO OFDM transmission to generate a plurality of channel matrices for a plurality of OFDM sub-carriers that corresponds to the wireless communication channel;

determining, based on the plurality of channel matrices for the plurality of OFDM sub-carriers, a first plurality of angles for a plurality of OFDM sub-carriers of the MIMO OFDM transmission using uniform quantization based on a first number of quantization bits;

determining, based on the plurality of channel matrices for the plurality of OFDM sub-carriers, a second plurality of angles for the plurality of OFDM sub-carriers of the MIMO OFDM transmission using uniform quantization based on a second number of quantization bits that is different than the first number of quantization bits, wherein the first plurality of angles and the second plurality of angles correspond to a plurality of beamforming matrices for plurality of OFDM sub-carriers for use by the another wireless communication device to make a subsequent MIMO OFDM transmission to the wireless communication device; and transmitting, via the communication interface of the wireless communication device, the first plurality of angles and the second plurality of angles to the another wireless communication device.

15. The method of claim 14 further comprising:

receiving, via the communication interface of the wireless communication device, another MIMO OFDM transmission from the another wireless communication device via the wireless communication channel, wherein the another MIMO OFDM transmission is beamformed for the wireless communication device based on the first plurality of angles and the second plurality of angles.

16. The method of claim 14 further comprising:

receiving another MIMO OFDM transmission from the another wireless communication device via the wireless communication channel;

processing the another MIMO OFDM transmission to generate another plurality of channel matrices for the plurality of OFDM sub-carriers that corresponds to the wireless communication channel;

determining, based on the another plurality of channel matrices for the plurality of OFDM sub-carriers, a third plurality of angles for the plurality of OFDM sub-carriers of the MIMO OFDM transmission using uniform quantization based on a third number of quantization bits;

determining, based on the another plurality of channel matrices for the plurality of OFDM sub-carriers, a fourth plurality of angles for the plurality of OFDM sub-carriers of the MIMO OFDM transmission using uniform quantization based on a fourth number of quantization bits that is different than the third number of quantization bits, wherein the third plurality of angles and the fourth plurality of angles correspond to another plurality of beamforming matrices for plurality of OFDM sub-carriers for use by the another wireless communication device to make another subsequent MIMO OFDM transmission to the wireless communication device; and transmitting, via the communication interface of the wireless communication device, the third plurality of angles and the fourth plurality of angles to the another wireless communication device.

17. The method of claim 14, wherein the wireless communication device is operative within a convergent network that includes a wireless local area network (WLAN) and a wired communication network.

18. The method of claim 14 further comprising:

receiving the MIMO OFDM transmission via 2 antennas of the wireless communication device, wherein the MIMO OFDM transmission is a 2×2 transmission that includes a plurality of streams transmitted via 2 antennas of the another wireless communication device via the wireless communication channel.

19. The method of claim 14 further comprising:

receive the MIMO OFDM transmission via n antennas of the wireless communication device, wherein the MIMO OFDM transmission is an m×n transmission that includes a plurality of streams transmitted via m antennas of the another wireless communication device via the wireless communication channel, wherein n is a first positive integer and m is a second positive integer that is different than n.

20. The method of claim 14 further comprising:

operating the communication interface of the wireless communication device to support communications within at least one of a satellite communication system, a cable communication system, a telephone communication system, a wireless communication system, a wired communication system, or a fiber-optic communication system.

* * * * *